(12) United States Patent
Shimazawa et al.

(10) Patent No.: US 8,248,892 B2
(45) Date of Patent: Aug. 21, 2012

(54) HEAD GIMBAL ASSEMBLY WITH TWO WIRING LAYERS COMPRISING THERMALLY-ASSISTED HEAD

(75) Inventors: Koji Shimazawa, Tokyo (JP); Kosuke Tanaka, Tokyo (JP); Takashi Honda, Shatin (HK)

(73) Assignee: TDK Corporation, Tokyo (JP)

( * ) Notice: Subject to any disclaimer, the term of this patent is extended or adjusted under 35 U.S.C. 154(b) by 232 days.

(21) Appl. No.: 12/860,349

(22) Filed: Aug. 20, 2010

(65) Prior Publication Data
US 2012/0044790 A1 Feb. 23, 2012

(51) Int. Cl.
*G11B 11/00* (2006.01)
(52) U.S. Cl. .................... 369/13.32; 360/59
(58) Field of Classification Search .............. 369/13.13, 369/13.33, 13.32, 13.02, 112.09, 112.21, 369/112.27, 13.03, 13.12, 13.17; 360/59; 250/201.3; 385/129
See application file for complete search history.

(56) References Cited

U.S. PATENT DOCUMENTS

| | | | |
|---|---|---|---|
| 5,481,082 A | 1/1996 | Yamamoto | |
| 5,737,152 A | 4/1998 | Balakrishnan | |
| 5,862,010 A | 1/1999 | Simmons et al. | |
| 7,538,978 B2 | 5/2009 | Sato et al. | |
| 7,804,655 B2 * | 9/2010 | Shimazawa et al. | 360/59 |
| 7,821,880 B2 * | 10/2010 | Tanaka et al. | 369/13.33 |
| 7,864,635 B2 * | 1/2011 | Shimizu | 369/13.02 |
| 2005/0213436 A1 | 9/2005 | Ono et al. | |
| 2008/0043360 A1 | 2/2008 | Shimazawa et al. | |
| 2008/0056073 A1 | 3/2008 | Shimizu | |
| 2009/0052078 A1 | 2/2009 | Tanaka et al. | |
| 2012/0008470 A1 * | 1/2012 | Shimazawa et al. | 369/13.24 |

FOREIGN PATENT DOCUMENTS

JP  A-2009-301597  12/2009

OTHER PUBLICATIONS

Rottmayer et al., "Heat-Assisted Magnetic Recording," *IEEE Transactions on Magnetics*, Oct. 2006, pp. 2417-2421, vol. 42, No. 1, IEEE.
U.S. Appl. No. 12/832,593, filed Jul. 8, 2010.

* cited by examiner

*Primary Examiner* — Ali Neyzari
(74) *Attorney, Agent, or Firm* — Oliff & Berridge, PLC

(57) ABSTRACT

Provided is a head gimbal assembly (HGA) in which the electrodes for a thermally-assisted magnetic recording head comprising a light source, a photodetector and a magnetic head element, can be reliably electrically connected to wiring members by solder ball bonding (SBB). The HGA comprises a suspension comprising: a base; a first wiring member for the light source and the photodetector, provided on a side of one surface of the base; and a second wiring member for the magnetic head element, provided on the same surface side. The first and second wiring members protrude from the base toward the head to be fixed. As a result, the end portions (connection pads) of the first and second wiring members can be located close to electrodes for light-source and photodetector and electrodes for magnetic head element, respectively. This arrangement enables the end portions of the first and second wiring members to be reliably electrically connected to the electrodes by SBB.

12 Claims, 10 Drawing Sheets

_US 8,248,892 B2_

HEAD GIMBAL ASSEMBLY WITH TWO WIRING LAYERS COMPRISING THERMALLY-ASSISTED HEAD

BACKGROUND OF THE INVENTION

1. Field of the Invention

The present invention relates to a thermally-assisted magnetic recording head used for thermally-assisted magnetic recording, and to a head gimbal assembly (HGA) including a suspension for supporting the head. The present invention further relates to a magnetic recording apparatus including the HGA.

2. Description of the Related Art

With the explosion in the use of the Internet in these years, a huge amount of data that are incommensurably larger than ever are stored and used on computers such as servers and information processing terminals. This trend is expected to further grow at an accelerated rate. Under these circumstances, demand for magnetic recording apparatuses such as magnetic disk apparatuses as mass storage is growing, and the demand for higher recording densities of the magnetic recording apparatuses is also escalating.

In the magnetic recording technology, it is necessary for magnetic heads to write smaller recording bits on magnetic recording media in order to achieve higher recording densities. In order to stably form smaller recording bits, perpendicular magnetic recording technology has been commercially implemented in which components of magnetization perpendicular to the surface of a medium are used as recording bits. In addition, thermally-assisted magnetic recording technology that enables the use of magnetic recording media having higher thermal stability of magnetization is being actively developed.

In the thermally-assisted magnetic recording technology, a magnetic recording medium formed of a magnetic material with a large energy $K_U$ is used so as to stabilize the magnetization, then anisotropic magnetic field of a portion of the medium, where data is to be written, is reduced by heating the portion; just after that, writing is performed by applying write field to the heated portion. Actually, there has been generally used a method in which a magnetic recording medium is irradiated and thus heated with a light such as near-field light (NF-light). In this case, it is significantly important where and how a light source with a sufficiently high light output should be disposed inside a head in order to stably supply a light with a sufficiently high intensity at a desired position on the magnetic recording medium.

As for the setting of the light source, for example, U.S. Pat. No. 7,538,978 B2 discloses a configuration in which a laser unit including a laser diode is mounted on the back surface of a slider, and US Patent Publication No. 2008/0056073 A1 discloses a configuration in which a structure of a laser diode element with a monolithically integrated reflection mirror is mounted on the back surface of a slider. Further, US Patent Publication No. 2005/0213436 A1 discloses a structure of slider that is formed together with a semiconductor laser, and Robert E. Rottmayer et al. "Heat-Assisted Magnetic Recording" IEEE TRANSACTIONS ON MAGNETICS, Vol. 42, No. 10, p. 2417-2421 (2006) discloses a configuration in which a diffraction grating is irradiated with a light generated from a laser unit provided within a drive apparatus.

Furthermore, the present inventors propose a thermally-assisted magnetic recording head with a "composite slider structure" which is constituted by joining a light source unit provided with a light source to the end surface (back surface) of a slider provided with a write head element, the end surface being opposite to the opposed-to-medium surface of the slider. The "composite slider structure" is disclosed in, for example, US Patent Publication No. 2008/043360 A1 and US Patent Publication No. 2009/052078 A1.

While various forms of installation of a light source have been proposed, all of the laser diodes described above are devices made of a semiconductor. Outputs of semiconductor devices vary in response to changes in ambient temperature. In particular, ambient temperatures that are assumed in environments in which magnetic disk apparatuses are used are in the range of −5 to 60° C., for example. Accordingly, the range of variations of light output from the light source provided in a head should be estimated to be considerably wide. In addition, since changes in temperature of the light source due to heat radiated from surrounding elements and the light source itself are also considerably large, the range of variations in light output from the light source further widens. Therefore, in order to stably provide output light with a constant intensity at different temperatures, there is needed a system for monitoring (checking) changes in light output from the light source in real time.

A thermally-assisted magnetic recording head with a "composite slider structure" which includes an optical system that propagates light for thermal assist and a system that monitors the light is capable of very stable, good thermally-assisted magnetic recording. When the thermally-assisted magnetic recording head is mounted on a suspension to form a head gimbal assembly (HGA), it becomes critically important how to mount the head onto the suspension and how to provide wiring for the light source, the monitoring system, and the magnetic head element.

In practice, in an HGA including such a "composite slider structure" head, wiring lines are required at least for the light source and the monitoring system in addition to the wiring lines of a conventional HGA. Considerations need to be made to prevent crosstalk between the wiring lines for the light source and the monitoring system and wiring lines for magnetic head element, especially the write head element. In addition, the terminal electrodes of the light source, the monitoring system and the magnetic head element are provided in various locations. All of these terminal electrodes need to be properly connected to wiring members. However, little provision has been made for the problem of such attachments and wiring.

SUMMARY OF THE INVENTION

Some terms used in the specification will be defined before explaining the present invention. In a layered structure or an element structure formed in the element-integration surface of a slider substrate or in the source-installation surface of a unit substrate of the magnetic recording head according to the present invention, when viewed from a standard layer or element, a substrate side is defined as "lower" side, and the opposite side as an "upper" side. Further, "X-, Y- and Z-axis directions" are indicated in some figures showing embodiments of the head according to the present invention as needed. Here, Z-axis direction indicates above-described "up-and-low" direction, and +Z side corresponds to a trailing side and −Z side to a leading side. And Y-axis direction indicates a track width direction, and X-axis direction indicates a height direction.

According to the present invention, a head gimbal assembly (HGA) is provided, which comprises: a thermally-assisted magnetic recording head formed by joining a light source unit and a slider, the light source unit comprising a light source and a photodetector that monitors light output from the light source, and the slider comprising a magnetic head element; and a suspension supporting the head, the suspension comprising: a base; a first wiring member for the light source and the photodetector, provided on a side of one surface of the base; and a second wiring member for the magnetic head element, provided on the side of the one surface of the base, the first wiring member and the second wiring member protruding from the base toward the thermally-assisted magnetic recording head.

The HGA according to the present invention includes the suspension having two-layered wiring on one surface in which the first wiring member and the second wiring member are disposed on the side of one surface of the base. Further, the first wiring member and the second wiring member protrude from the base toward the head to be fixed to the suspension. As a result, the end portions (connection pads) of the first wiring member and the second wiring member can be located close to electrodes for light-source and photodetector and electrodes for magnetic head element, respectively. This arrangement enables the end portions of the first and second wiring members to be reliably electrically connected to the corresponding electrodes by solder ball bonding (SBB). The SBB enables connections that are more reliable, stable, and resistant to mechanical impact than wire bonding, for example.

In the HGA according to the present invention, a first insulating section, the first wiring member, a second insulating section, and the second wiring member are preferably stacked on the one surface of the base in this order. In the embodiment of the stacked structure, it is more preferable that the suspension includes an opening or a hole; the thermally-assisted magnetic recording head is fixed onto the suspension in such a manner that the light source unit protrudes through the opening or hole to a side of the suspension opposite to a side on which the first and second wiring members are provided; the first wiring member, the second insulating section and the second wiring member protrude from the base toward the thermally-assisted magnetic recording head in the opening or hole; and at least the second insulating section and the second wiring member further protrude into an indentation provided in a portion of an overcoat layer provided in the slider, the portion being on a side opposite to an opposed-to-medium surface of the overcoat layer.

Further, in the above-described HGA in which the suspension includes the opening or hole, the first wiring member and the second wiring member are more preferably at a distance from each other without overlapping with each other when viewed from above the one surface of the base. And it is also more preferable that a grounded lead conductor for the light source and a grounded lead conductor for the photodetector are provided independently of each other. Further, it is more preferable that the magnetic head element includes an electromagnetic transducer for writing data, and lead conductors of the first wiring member for the photodetector and lead conductors of the second wiring member for the electromagnetic transducer are provided at the greatest distance apart from each other among all the lead conductors. This arrangement of the first and second wiring members can avoid superimposition of noise on outputs from the elements in the head caused by crosstalk between these wiring members through which currents (signals) are flowing. The most serious crosstalk effect is that the wiring member for the photodiode picks up a high-frequency signal component of write current flowing through the wiring member for an electromagnetic transducer, and noise corresponding to the high-frequency signal component is superimposed on an output from the photodiode. Such noise adversely affects feedback control of light output from the laser source, which uses the output from the photodiode, and can hinder constant proper thermal-assist operation. However, the above-described arrangement of the wiring members can solve the serious crosstalk problem.

Furthermore, in the HGA according to the present invention, it is preferable that the light source is an edge-emitting type laser diode, and a p-type electrode of the light source is bonded in a source-installation surface of a unit substrate of the light source unit. In the embodiment of provision of the light source with p-type electrode as a bottom, it is preferable that a first electrode for the photodetector electrically connected to a p-type portion of the photodetector, a second electrode for the photodetector electrically connected to an n-type portion of the photodetector, and a first electrode for the light source electrically connected to a p-type electrode of the light source are provided in the source-installation surface of the light source unit; a second electrode for the light source is provided on an n-type electrode of the light source; and the first electrode for the photodetector, the second electrode for the photodetector, the first electrode for the light source, and the second electrode for the light source are electrically connected to the first wiring member.

Further, in the HGA according to the present invention, it is also preferable that the photodetector is formed inside the unit substrate of the light source unit, and a light-receiving portion of the photodetector is located on the source-installation surface side of the unit substrate, the light-receiving portion being configured to receive light emitted from a rear light-emission center positioned on a side opposite to a light-emission center of the light source, the light-emission center emitting light for thermal assist. In the case, the photodetector is preferably a semiconductor photodiode formed from a portion of the unit substrate.

According to the present invention, further provided is a suspension used for a thermally-assisted magnetic recording head comprising a light source, a photodetector that monitors light output from the light source, and a magnetic head element. Here, the suspension comprises: a base; a first wiring member for the light source and the photodetector, provided on a side of one surface of the base; and a second wiring member for the magnetic head element, provided on the side of the one surface of the base, the first wiring member and the second wiring member protruding from the base toward the thermally-assisted magnetic recording head to be fixed to the suspension.

According to the present invention, further provided is a magnetic recording apparatus comprising: at least one HGA as described above; at least one magnetic recording medium; and a control circuit configured to control light-emission operations of the light source by using a monitor output from the photodetector, and to control write operations that the thermally-assisted magnetic recording head performs to the at least one magnetic recording medium.

Further objects and advantages of the present invention will be apparent from the following description of preferred embodiments of the invention as illustrated in the accompanying figures. In each figure, the same element as an element shown in other figure is indicated by the same reference numeral. Further, the ratio of dimensions within an element and between elements becomes arbitrary for viewability.

DESCRIPTION OF THE PREFERRED EMBODIMENTS

Figure 1:
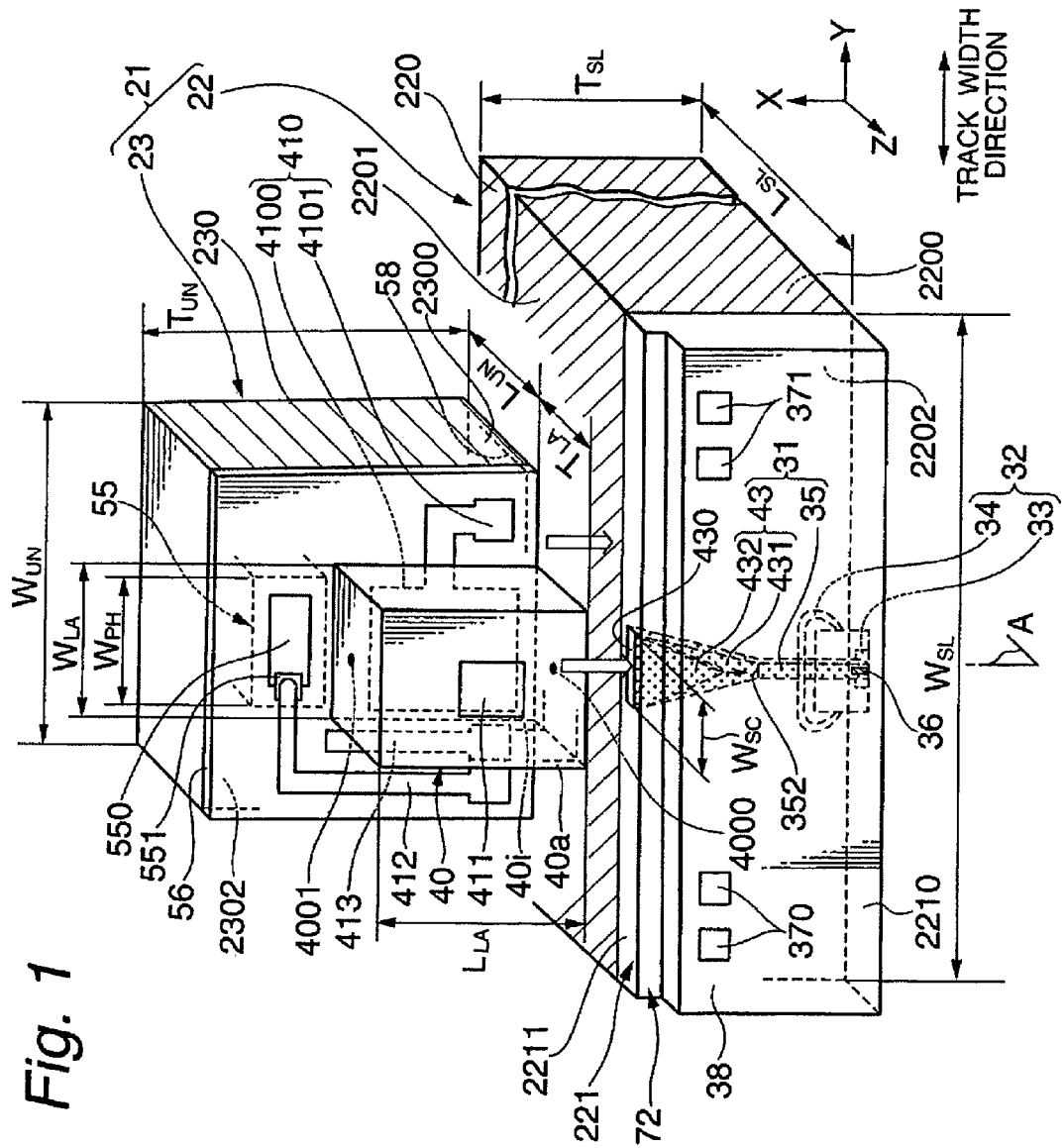
FIG. 1 shows a perspective view illustrating one embodiment of a thermally-assisted magnetic recording head according to the present invention.

FIG. 1 shows a perspective view illustrating one embodiment of a thermally-assisted magnetic recording head according to the present invention.

As shown in FIG. 1, a thermally-assisted magnetic recording head 21 is constituted by aligning and joining a light source unit 23, which includes a laser diode 40 as a light source and a photodiode section 55 as a photo-detecting part, and a slider 22, which includes an optical system 31.

The slider 22 includes: a slider substrate 220 having an air bearing surface (ABS) 2200 processed so as to provide an appropriate flying height; and a head element part 221 that includes an optical system 31 and is formed on an element-integration surface 2202 that is perpendicular to and adjacent to the ABS 2200. While, the light source unit 23 includes: a unit substrate 230 having an joining surface 2300; a laser diode 40 as a light source provided on a source-installation surface 2302 that is perpendicular to and adjacent to the joining surface 2300; and a photodiode section 55 formed within the unit substrate 230 and configured to measure and monitor the light output of the laser diode 40.

These slider 22 and light source unit 23 are bonded to each other in such a way that the back surface 2201 of the slider substrate 220 and the joining surface 2300 of the unit substrate 230 are opposed to each other and sandwich a solder layer 58 as an adhesion layer therebetween.

Referring also to FIG. 1, in an overcoat layer 38 provided on the slider 22, an indentation (groove) 72 is provided on the side opposite to the ABS 2200. When the thermally-assisted magnetic recording head 21 is mounted onto a suspension 20 (FIG. 8a) to form a head gimbal assembly (HGA), wiring members of the suspension 20 are protruded from a flexure 201 (FIG. 8a) into the indentation 72, as will be detailed later. This arrangement enables proper electrical connection of the laser diode 40, the photodiode section 55, and the magnetic head element 32 provided on the slider 22 to the wiring members, as will be detailed later.

(Light Source Unit)

In the light source unit 23 as also shown in FIG. 1, the laser diode 40 can be a semiconductor diode of edge-emitting type. The laser diode 40 has a light-emission center 4000 from which laser light for thermal assist is emitted and a rear light-emission center 4001 positioned on the opposite side to the light-emission center 4000. The laser diode 40 is provided in the source-installation surface 2302 of the unit substrate 230 in such a way that the light-emission center 4000 is opposed to the light-receiving surface 430 of a spot-size converter 43.

While a photodiode section 55 is a semiconductor photodiode structure formed of a portion of the unit substrate 230 and is included in the unit substrate 230. The photodiode section 55 is located on the rear side (on +X side) of the laser diode 40 when viewed from the side of the joining surface 2300 of the unit substrate 230. The photodiode section 55 includes a light-receiving portion 550 that is located on the source-installation surface 2302 side of the unit substrate 230 and faces the source-installation surface 2302 in the present embodiment. The light-receiving portion 550 is provided in a position in which laser light emitted from the rear light-emission center 4001 of the laser diode 40 can be received. A p-electrode 551 is electrically connected to a p-type semiconductor portion of the photodiode section 55. The laser diode 40 is bonded to the unit substrate 230 with a p-electrode layer 40i (FIG. 2) closer to the rear light-emission center 4001 down (so that the p-electrode layer 40i faces the source-installation surface 2302) as will be detailed later. Accordingly, the rear light-emission center 4001 is located closer to the light-receiving portion 550 (source-installation surface 2302) compared with the case where the laser diode 40 was bonded in the reverse orientation.

With the configuration described above, the photodiode section 55 can receive, at its light-receiving portion 550, laser light (monitor light) emitted from the rear light-emission center 4001. By using the photodiode section 55 to detect the monitor light output, an output of laser light for thermal assist emitted from the light-emission center 4000 of the laser diode 40 can be monitored in real time. Since the rear light-emission center 4001 of the laser diode 40 and the light-receiving portion 550 of the photodiode section 55 can be located sufficiently close to each other, the light output from the laser diode 40 can be monitored with a higher efficiency.

The monitoring with the photodiode section 55 enables feedback adjustment of the front output of the laser diode 40 as a thermal assist light source. That is, the monitor output from the photodiode section 55 can be used to perform feedback adjustment of laser light output for thermal assist emitted from the laser diode 40. In addition, since the light output of the laser diode 40 can be adjusted in response to changes in the light output due to environmental influence or changes in the light output over time to stabilize the intensity of near-field light (NF-light) 62 for thermal assist (FIG. 3) applied to a magnetic disk 10 (FIG. 6), a region on the magnetic disk 10 where data is to be written can be properly and stably heated.

Referring also to FIG. 1, a first lead electrode 412 electrically connected to the p-electrode 551 connected to the p-type semiconductor portion of the photodiode section 55 and a second lead electrode 413 electrically connected to the n-type semiconductor portion of the photodiode section 55 are provided in the source-installation surface 2302 of the light source unit 23. The first lead electrode 412 is electrically insulated from the unit substrate 230 by an insulation layer 56 made of an insulating material such as $SiO_2$ or $Al_2O_3$, provided on the source-installation surface 2302. On the other hand, a portion of the second lead electrode 413 passes through the insulation layer 56 and is electrically connected to the n-type semiconductor portion inside the unit substrate 230. A light-source lead electrode 410 to be electrically connected to the p-electrode layer 40$i$ (FIG. 2) of the laser diode 40 is also provided on the insulation layer 56 provided on the source-installation surface 2302 of the light source unit 23. Here, the light-source lead electrode 410 includes a light-source electrode part 4100 and a lead part 4101. The laser diode 40 is bonded onto the light-source electrode part 4100 by soldering or otherwise. A light-source terminal electrode 411 is provided on an n-electrode layer 40$a$ (FIG. 2), which forms the upper surface of the laser diode 40, and is electrically connected to the n-electrode layer 40$a$.

The first and second lead electrodes 412 and 413, the lead part 4101 (a light-source lead electrode layer 410), and the light-source terminal electrode 411 are electrically connected to connection pads of wiring members provided on the flexure 201 of the HGA (FIG. 8$a$) by solder ball bonding (SBB). The SBB uses solder balls to electrically connect between electrodes (pads). The solder may be a metal material containing Sn, Pb, Au, Ag, Cu, Zn, Al, Bi, or In, for example. Design of these electrodes and a mode of connection between the electrodes and the wiring members on the flexure 201 will be described later in detail.

Referring also to FIG. 1, the unit substrate 230 is preferably made of a semiconductor material such as Si or GaAs so that a portion of the unit substrate 230 can be processed and formed into the semiconductor photodiode structure to provide the photodiode section 55 inside the unit substrate 230. If the unit substrate 230 is made of such a semiconductor material, the solder layer 58 can be melted by irradiation with light such as Nd-YAG laser light through the unit substrate 230 while joining the light source unit 23 and the slider 22 with the solder layer 58. The solder layer 58 is preferably made of an alloy containing one element selected from the group consisting of Au (gold), Ag (silver), Cu (copper), Ge (germanium), Al (aluminum) and Mg (magnesium) that has a melting point of lower than 400° C.

As also shown in FIG. 1, the unit substrate 230 is somewhat smaller than the slider substrate 220. However, the width $W_{UN}$ of the unit substrate 230 in the track width direction (Y-axis direction) is larger than the width $W_{LA}$ of the laser diode 40 in the track width direction (Y-axis direction), so that the first and second lead electrodes 412 and 413, and the lead part 4101 are exposed in the source-installation surface 2302 even after the laser diode 40 is mounted on the light-source electrode part 4100. In the case of using a Femto slider as the slider substrate 220, for example, the unit substrate 230 may have a thickness $T_{UN}$ (in X-axis direction) of 450 μm (micrometers), a width $W_{UN}$ in the track width direction of 500 μm, and a length $L_{UN}$ (in Z-axis direction) of 300 μm.

(Slider)

In the slider 22 as also shown in FIG. 1, the head element part 221 formed on the element-integration surface 2202 includes: a head element 32 constituted of a magnetoresistive (MR) element 33 for reading data from the magnetic disk 10 (FIG. 6) and an electromagnetic transducer 34 for writing data to the magnetic disk 10; a spot-size converter 43 that receives a laser light emitted from the laser diode 40, changes (reduces) the spot size of the laser light, then guides the laser light into the waveguide 35; a waveguide 35 that guides the laser light with changed spot size to the head end surface 2210 as an opposed-to-medium surface or its vicinity; a surface plasmon generator 36 that generates NF-light for thermal assist by coupling with the laser light propagating the waveguide 35; and an overcoat layer 38 formed on the element-integration surface 2202 so as to cover the head element 32, the spot-size converter 43, the waveguide 35 and the surface plasmon generator 36. Here, the spot-size converter 43, the waveguide 35 and the surface plasmon generator 36 constitute the optical system 31 for generating NF-light in the head 21 (head element part 221). The spot-size converter 43 and waveguide 35 are covered with the overcoat layer 38, and functions as a core in light propagation, whereas the portion of overcoat layer 38 that covers them functions as a clad.

One ends of the MR element 33, the electromagnetic transducer 34 and the surface plasmon generator 36 reach the head end surface 2210 as an opposed-to-medium surface. Here, the head end surface 2210 and the ABS 2200 constitute the whole opposed-to-medium surface of the thermally-assisted magnetic recording head 21. During actual write and read operations, the thermally-assisted magnetic recording head 21 aerodynamically flies above the surface of the rotating magnetic disk 10 with a predetermined flying height. Thus, the ends of the MR element 33 and electromagnetic transducer 34 face the surface of the magnetic record layer of the magnetic disk 10 with a appropriate magnetic spacing. Then, MR element 33 reads data by sensing signal magnetic field from the magnetic record layer, and the electromagnetic transducer 34 writes data by applying signal magnetic field to the magnetic record layer. When writing data, laser light, which is generated from the laser diode 40 of the light source unit 23 and propagates through the spot-size converter 43 and the waveguide 35, is changed into NF-light 62 (FIG. 3) in the surface plasmon generator 36. Then, a portion to be written of the magnetic recording layer is irradiated and thus heated with the NF-light 62. As a result, the anisotropic magnetic field (coercive force) of the portion is decreased to a value that enables writing; thus the thermally-assisted magnetic recording can be achieved by applying write field with use of the electromagnetic transducer 34 to the anisotropic-field-decreased portion.

Referring also to FIG. 1, the spot-size converter 43 is an optical element which receives laser light emitted from the laser diode 40 at its light-receiving end surface 430 having a width $W_{SC}$ in the track width direction (Y-axis direction), converts the laser light to laser light with a smaller spot diameter, and then guides the converted laser light to a light-receiving end surface 352 of the waveguide 35. The spot-size converter 43 in the present embodiment includes a lower propagation layer 431 and an upper propagation layer 432. The lower propagation layer 431 has a width in the track width direction (Y-axis direction) that gradually decreases from the width $W_{SC}$ along the traveling direction (−X direction) of laser light incident through the light-receiving end surface 430. The upper propagation layer 432 is stacked on the lower propagation layer 431 and has a width in the track width direction (Y-axis direction) that more steeply decreases from the width $W_{SC}$ along the traveling direction (−X direction) of laser light than the lower propagation layer 431. Laser light incident through the light-receiving end surface 430 is converted to laser light with a smaller spot size as the laser light propagates through the layered structure, and reaches the light-receiving end surface 352 of the waveguide 35.

The width $W_{SC}$ of the spot-size converter 43 at the light-receiving end surface 430 may be in the range of approximately 1 to 10 μm, for example. The spot-size converter 43 is made of a material with a refractive index higher than the refractive index $n_{OC}$ of the constituent material of the surrounding overcoat layer 38. The spot-size converter 43 can be formed from the same dielectric material as the waveguide 35, which will be described below. In the case, the spot-size converter 43 and the waveguide 35 may be formed integrally.

The waveguide 35 in the present embodiment extends in parallel with the element-integration surface 2202 from the light-receiving end surface 352 that receives laser light emitted from the spot-size converter 43 to the end surface 350 on the head end surface 2210 side. Here, the end surface 350 may be a portion of the head end surface 2210, or may be recessed from the head end surface 2210 with a predetermined distance. A portion of one side surface of the waveguide 35 near the end surface 350 faces a surface plasmon generator 36. This allows laser light (waveguide light) incident through the light-receiving end surface 352 and traveling through the waveguide 35 to reach the portion facing the surface plasmon generator 36, thereby to be coupled with the generator 36 in a surface plasmon mode.

Referring again to FIG. 1, a pair of terminal electrodes 370 for the MR element 33 and a pair of terminal electrodes 371 for the electromagnetic transducer 34 are provided on the upper surface of the overcoat layer 38 of the slider 22. As will be detailed later, the terminal electrodes 371 for the electromagnetic transducer 34 are preferably provided on the side opposite to the first and second lead electrodes 412 and 413 for the photodiode section 55 in the track width direction (in Y-axis direction). The terminal electrodes 370 and 371 are electrically connected to connection pads of the wiring members provided on the flexure 201 of the HGA (FIG. 8a) by SBB method. A mode of the connection between these terminal electrodes and the wiring members on the flexure 201 will also be described later in detail.

The slider substrate 220 may be, for example, a so-called Femto slider having a thickness (in X-axis direction) $T_{SL}$ of 230 μm, a width $W_{SL}$ of 700 μm in the track width direction (Y-axis direction), and a length $L_{SL}$ (in Z-axis direction) of 850 μm. The slider substrate 220 can be formed of a ceramic material such as AlTiC ($Al_2O_3$—TiC) or $SiO_2$.

(Thermally-Assisted Magnetic Recording Head)

As described above, the thermally-assisted magnetic recording head 21 has the structure in which the slider 22 and the light source unit 23 are joined. Thus, the slider 22 and the light source unit 23 can be separately fabricated and then combined together to fabricate the head 21. Consequently, the production yield of the entire heads is about the same as the production yield of the sliders 22 if performance evaluation of the light source units 23 is performed prior to the fabrication of the heads and only good light source units 23 are used for the fabrication of the heads. Thus, significantly adverse influence to the production yield of heads 21 in the head manufacturing process due to the rejection rate of light-source units 23 can be avoided.

Figure 2:
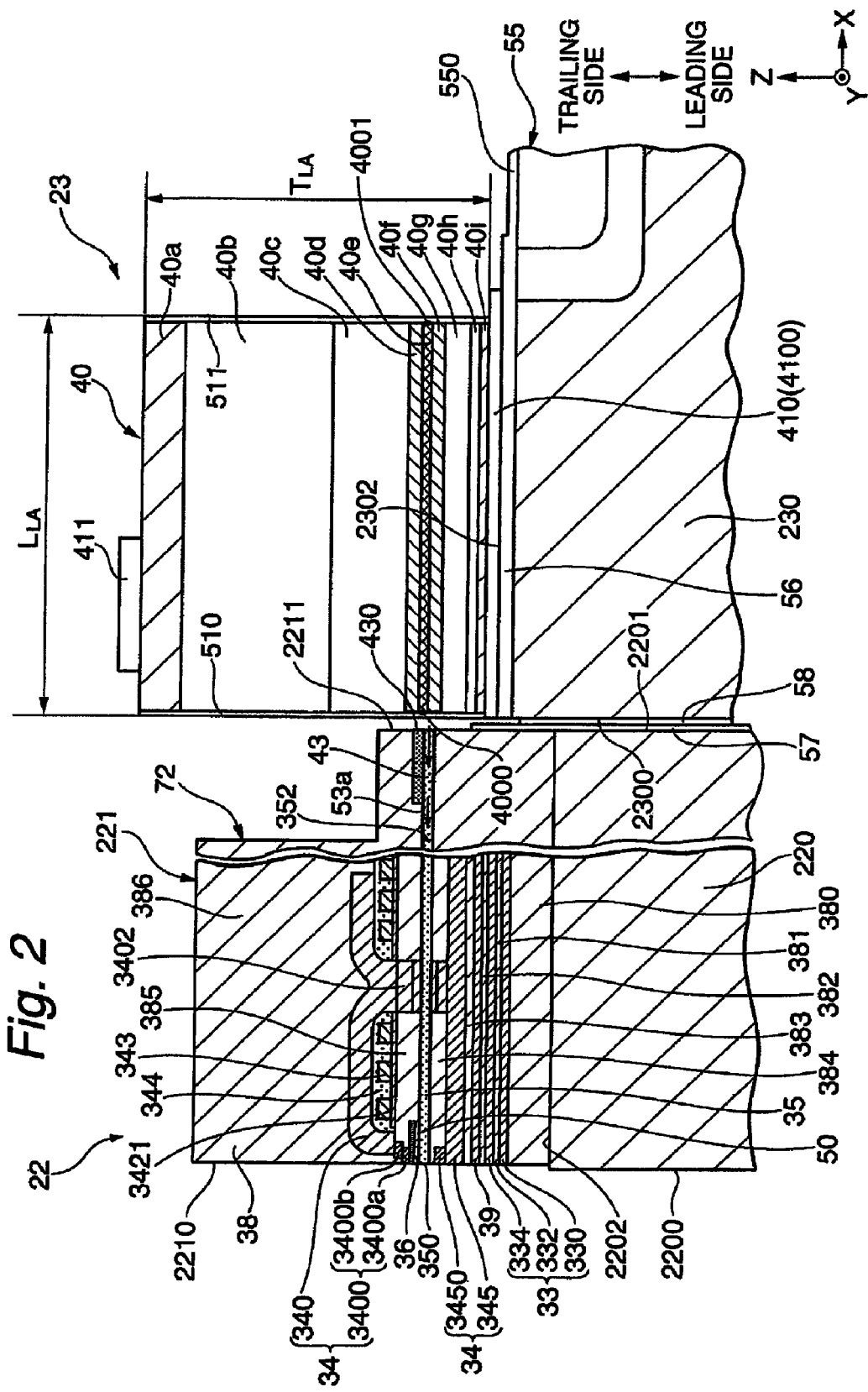
FIG. 2 shows a cross-sectional view taken by plane A in FIG. 1, schematically illustrating the structures of the head element part of the slider, the laser diode of the light source unit, and their vicinities in the thermally-assisted magnetic recording head, according to the present invention.

FIG. 2 shows a cross-sectional view taken by plane A in FIG. 1, schematically illustrating the structures of the head element part 221 of the slider 22, the laser diode 40 of the light source unit 23, and their vicinities in the thermally-assisted magnetic recording head 21.

(Laser Diode)

According to FIG. 2, the laser diode 40 is of edge-emitting type. As the laser diode 40, InP base, GaAs base or GaN base diodes can be utilized, which are usually used for communication, optical disk storage, or material analysis. The wavelength $\lambda_L$ of the emitted laser light may be, for example, in the range of approximately 375 nm (nanometers) to 1.7 μm. The laser diode 40 shown in FIG. 2 has a multilayered structure in which sequentially stacked from the light-source terminal electrode 411 side as an upper surface side is: an n-electrode layer 40a; an n-GaAs substrate 40b; an n-InGaAlP clad layer 40c; the first InGaAlP guide layer 40d; an active layer 40e formed of multiquantum well (InGaP/InGaAlP) or the like; the second InGaAlP guide layer 40f; an p-InGaAlP clad layer 40g; a p-electrode base layer 40h; and a p-electrode layer 40i. Further, on the front and rear cleaved surfaces of the multilayered structure of the laser diode 40, respectively formed are reflective layers 510 and 511 for exciting the oscillation by total reflection. Here, the light-emission center 4000 exists at the position of the active layer 40e on the reflective layer 510, and the rear light-emission center 4001 exists at the position of the active layer 40e on the reflective layer 511.

Of course, the structure of the laser diode 40 is not limited to the above-described one. However, the laser diode 40 is disposed in such a manner that the p-electrode layer 40i is positioned at the bottom and is bonded to the light-source electrode part 4100 of the light-source lead electrode 410. In edge-emitting laser diodes in general, the active layer 40e (light-emission center 4000, rear light-emission center 4001) is closer to the p-electrode layer 40i than the n-electrode layer 40a in the direction in which the layers are stacked (Z-axis direction). Accordingly, by positioning the p-electrode layer 40i at the bottom, the distance (in Z-axis direction) between the rear light-emission center 4001 and the source-installation surface 2302 can be set to a smaller value. Consequently, the position of the light-receiving portion 550 of the photodiode section 55 can be easily designed in such a manner that laser light (monitor light) emitted with its emitting center in the rear light-emission center 4001 can be sufficiently incident on the light-receiving portion 550 which is almost in plane with the light-source installation surface 2302.

Further, by placing the laser diode 40 with the p-electrode layer 40i at the bottom, heat generated from the laser diode 40 can be appropriately diffused. In fact, the appropriate disposal of heat generated from the laser diode 40 is very important for maintaining the operations of the laser diode 40 and the other elements within the head. By setting the laser diode 40 with its p-electrode layer 40i as a bottom, the p-electrode layer 40i being closer to the active layer 40e that generates most amount of heat during operation, the unit substrate 230 can more effectively function as a heatsink of the light source.

An electric source provided within the magnetic disk apparatus can be used for driving the laser diode 40. In fact, the magnetic disk drive apparatus usually has an electric source with applying voltage of, for example, approximately 2 to 5V, which is sufficient for the laser oscillation. The laser diode 40 may have a width $W_{LA}$ (FIG. 1) of, for example, approximately 150 to 250 μm. The length $L_{LA}$ of the laser diode 40 corresponds approximately to a cavity length that is the distance between the reflective layers 510 and 511, and is, for example, 300 μm. The length $L_{LA}$ is preferably 300 μm or more in order to obtain a sufficient high output. Further, the height $T_{LA}$ of the laser diode 40 is, for example, approximately 60 to 200 μm.

Referring to FIG. 2, the p-electrode layer 40i of the laser diode 40 and the light-source electrode part 4100 (light-source lead electrode 410) of the unit substrate 230 can be bonded to each other by soldering using one of lead-free solders such as Au—Sn alloy. Further, the slider 22 and the light source unit 23 are bonded to each other in such a way that the back surface 2201 of the slider substrate 220 and the joining surface 2300 of the unit substrate 230 are opposed to each other and sandwich a solder layer 58 as an adhesion layer therebetween. Further, an insulating film 57 for electrically insulating the unit substrate 230 from the slider substrate 220 is preferably provided on the back surface 2201 of the slider substrate 220 and the end surface 2211 of the head element part 221. The insulating film 57 ensures electrical insulation between the unit substrate 230 and the slider substrate 220. Here, the slider substrate 220 is usually grounded. The unit substrate 230, on the other hand, is at the same potential as the n-type semiconductor portion of the photodiode section 55, of course. The n-type semiconductor portion (or the second lead electrode 413 electrically connected to the n-type semiconductor portion) usually cannot be used in such a way as to be grounded. Therefore, the insulation between the slider substrate 220 and the unit substrate 230 is essential.

(Head Element Part)

As shown also in FIG. 2, the head element part 221 includes an MR element 33 and an electromagnetic transducer 34 and an optical system 31.

The MR element 33 is formed on a base layer 380 that is formed of an insulating material such as $Al_2O_3$ (alumina), $SiO_2$ and stacked on the element-integration surface 2202. The MR element 33 includes: an MR multilayer 332; and a lower shield layer 330 and an upper shield layer 334 which are formed of a soft-magnetic material and sandwich the MR multilayer 332 and an insulating layer 381 therebetween. The MR multilayer 332 is a magneto-sensitive part for detecting signal magnetic field by utilizing MR effect. The MR multilayer 332 may be, for example: a current-in-plane giant magnetoresistive (CIP-GMR) multilayer that utilizes CIP-GMR effect; a current-perpendicular-to-plane giant magnetoresistive (CPP-GMR) multilayer that utilizes CPP-GMR effect; or a tunnel magnetoresistive (TMR) multilayer that utilizes TMR effect.

The electromagnetic transducer 34 is designed for perpendicular magnetic recording, and includes an upper yoke layer 340, a main magnetic pole 3400, a write coil layer 343, a coil-insulating layer 344, a lower yoke layer 345, and a lower shield 3450.

The upper yoke layer 340 is formed so as to cover the coil-insulating layer 344, and the main magnetic pole 3400 is formed on an insulating layer 385 made of an insulating material such as $Al_2O_3$ (alumina). These upper yoke layer 340 and main magnetic pole 3400 are magnetically connected with each other, and acts as a magnetic path for converging and guiding magnetic flux toward the magnetic recording layer (perpendicular magnetization layer) of the magnetic disk 10 (FIG. 6), the magnetic flux being excited by write current flowing through the write coil layer 343. The main magnetic pole 3400 includes: a first main pole portion 3400a reaching the head end surface 2210 and having a small width $W_P$ (FIG. 3) in the track width direction; and a second main pole portion 3400b located on the first main pole portion 3400a and at the rear (+X side) of the portion 3400a. Here, the above-described width $W_P$ is the length of an edge in the track width direction (Y-axis direction) of the end surface 3400e on the head end surface 2210, and defines the width of write field distribution in the track width direction (Y-axis direction). The width $W_P$ can be set to be, for example, 0.05 to 0.5 μm. The main magnetic pole 3400 is preferably formed of a soft-magnetic material with a saturation magnetic flux density higher than that of the upper yoke layer 340, which is, for example, an iron alloy containing Fe as a main component.

The write coil layer 343 is formed on an insulating layer 385 made of an insulating material such as $Al_2O_3$ (alumina), in such a way as to pass through in one turn at least between the lower yoke layer 345 and the upper yoke layer 340, and has a spiral structure with a back contact portion 3402 as a center. The write coil layer 343 is formed of a conductive material such as Cu (copper). The write coil layer 343 is covered with a coil-insulating layer 344 that is formed of an insulating material such as a heat-cured photoresist and electrically isolates the write coil layer 343 from the upper yoke layer 340. The write coil layer 343 has a monolayer structure in the present embodiment; however, may have a two or more layered structure or a helical coil shape. Further, the number of turns of the write coil layer 343 is not limited to that shown in FIG. 2, and may be, for example, in the range from two to seven.

The back contact portion 3402 has a though-hole extending in X-axis direction, and the waveguide 35 and insulating layers that covers the waveguide 35 pass through the though-hole. In the though-hole, the waveguide 35 is away at a predetermined distance of, for example, at least 1 μm from the inner wall of the back contact portion 3402. The distance prevents the absorption of the waveguide light by the back contact portion 3402.

The lower yoke layer 345 is formed on an insulating layer 383 made of an insulating material such as $Al_2O_3$ (alumina), and acts as a magnetic path for the magnetic flux returning from a soft-magnetic under layer that is provided under the magnetic recording layer (perpendicular magnetization layer) of the magnetic disk 10. The lower yoke layer 345 is formed of a soft-magnetic material. Further, the lower shield 3450 is a part of the magnetic path, being connected with the lower yoke layer 345 and reaching the head end surface 2210. The lower shield 3450 is opposed to the main magnetic pole 3400 through the surface plasmon generator 36, and acts for receiving the magnetic flux spreading from the main magnetic pole 3400. The lower shield 3450 is preferably formed of a material with high saturation magnetic flux density such as NiFe (Permalloy) or an iron alloy as the main magnetic pole 3400 is formed of.

Referring also to FIG. 2, the optical system 31 includes a spot-size converter 43, a waveguide 35 and a surface plasmon generator 36.

Laser light 53a, the spot size of which the spot-size converter 43 changes (reduces), enters the waveguide 35 from the light-receiving end surface 352, and propagates through the waveguide 35. The waveguide 35 extends from the light-receiving end surface 352 to the end surface 350 on the head end surface 2210 side through the through-hole that is provided in the back contact portion 3402 and extends in X-axis direction. Furthermore, the surface plasmon generator 36 is a near-field light generator (NFL-generator) that transforms the laser light (waveguide light) propagating through the waveguide 35 into NF-light. A part on the head end surface 2210 side of the waveguide 35 and the surface plasmon generator 36 are provided between the lower shield 3450 (lower yoke layer 345) and the main magnetic pole 3400 (upper yoke layer 340). Further, a portion of the upper surface (side surface) of the waveguide 35 on the head end surface 2210 side is opposed to a portion of the lower surface (including a propagative edge 360 (FIG. 3)) of the surface plasmon antenna 36 with a predetermined distance. The sandwiched portion between these portions constitutes a buffering portion 50 having a refractive index lower than that of the waveguide 35. The buffering portion 50 acts for coupling the laser light (waveguide light) that propagates through the waveguide 35 with the surface plasmon generator 36 in a surface plasmon mode. A detailed explanation of the waveguide 35, the buffering portion 50 and the surface plasmon generator 36 will be given later with reference to FIG. 3.

Further, also as shown in FIG. 2, an inter-element shield layer 39 is preferably provided between the MR element 33 and the electromagnetic transducer 34 (lower yoke layer 345), sandwiched by the insulating layers 382 and 383. The inter-element shield layer 39 plays a role for shielding the MR element 33 from the magnetic field generated from the electromagnetic transducer 34, and may be formed of a soft-magnetic material. Here, the above-described insulating layers 381, 382, 383, 384, 385 and 386 constitute the overcoat layer 38.

Referring again to FIG. 2, in the overcoat layer 38 provided on the slider 22, an indentation (groove) 72 is provided on the side opposite to the head end surface 2210 (ABS 2200). When a thermally-assisted magnetic recording head 21 is mounted onto a suspension 20 (FIG. 8a) to form an HGA, wiring members of the suspension 20 are protruded into the indentation 72, as will be detailed later. Here, the indentation 72 may be formed by a method such as wet etching, dry etching, or polishing during the wafer process for forming the head element part 221, or by a method such as polishing during a process subsequent to the wafer process. The indentation 72 has such a depth that the indentation 72 does not reach the spot-size converter 43 and the waveguide 35 in Z-axis direction. In practice, the overcoat layer 38 having a sufficient thickness for functioning as a clad need to be provided around the spot-size converter 43 and the waveguide 35. The depth of the indentation 72 in Z-axis direction is limited by this clad requirement.

Figure 3:
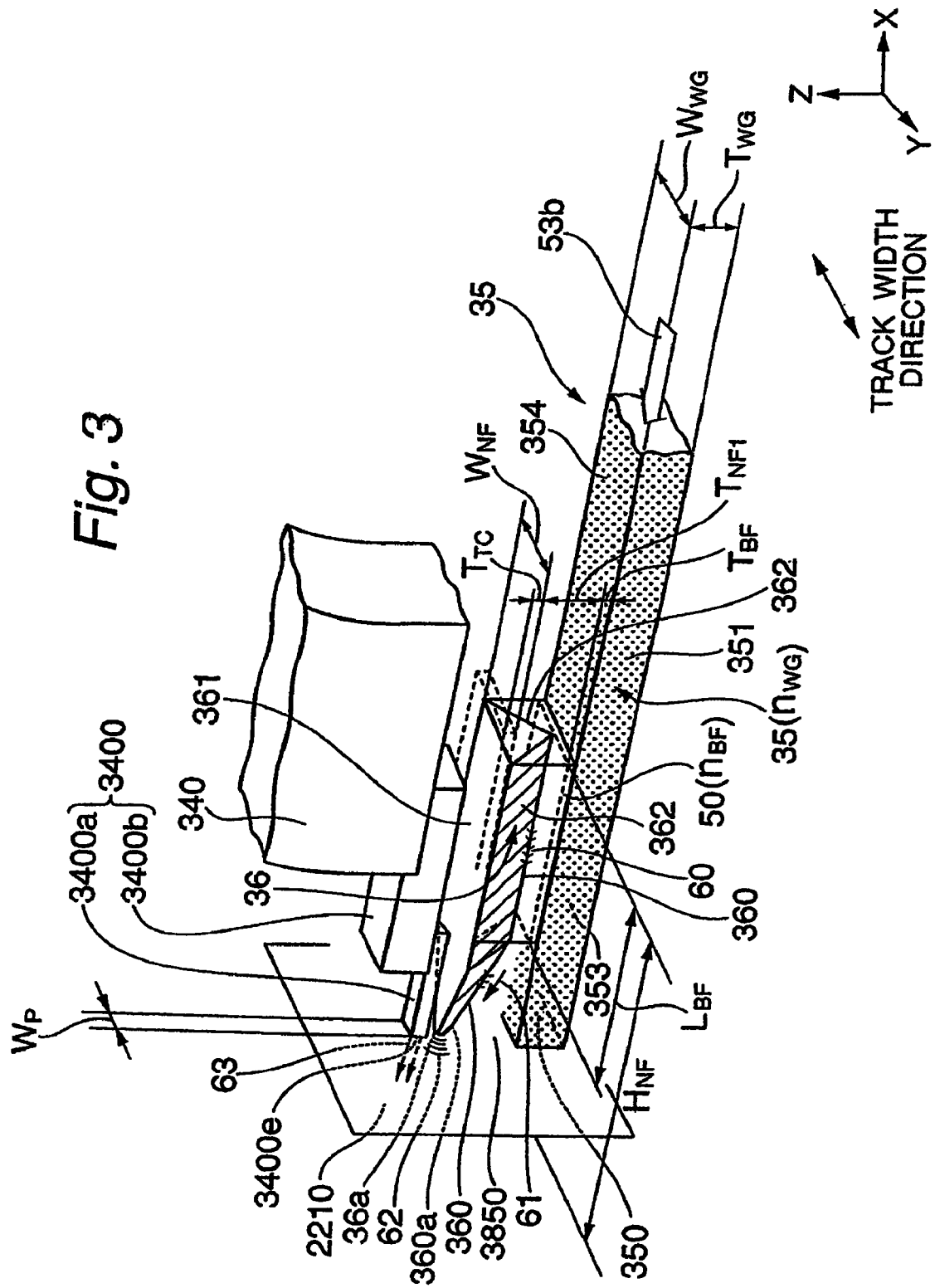
FIG. 3 shows a perspective view schematically illustrating the configuration of the waveguide, the surface plasmon generator and the main magnetic pole.

FIG. 3 shows a perspective view schematically illustrating the configuration of the waveguide 35, the surface plasmon generator 36 and the main magnetic pole 3400. In the figure, the head end surface 2210 is positioned at the left side, the surface 2210 including positions where write field and NF-light are emitted toward the magnetic recording medium.

As shown in FIG. 3, the configuration includes the waveguide 35 for propagating laser light (waveguide light) 53b used for generating NF-light toward the end surface 350, and the surface plasmon generator 36 that has a propagative edge 360 as an edge on which surface plasmon excited by the laser light (waveguide light) 53b propagates. The surface plasmon generator 36 further includes a near-field light generating (NFL-generating) end surface 36a that reaches the head end surface 2210 and is a destination for the excited surface plasmon. The propagative edge 360 extents to the NFL-generating end surface 36a. Further, a buffering portion 50 is a portion sandwiched between a portion of the side surface 354 of the waveguide 35 and a portion of the lower surface 362 including the propagative edge 360 of the surface plasmon generator 36. That is, the propagative edge 360 is covered with the buffering portion 50. The buffering portion 50 acts for coupling the waveguide light 53b with the surface plasmon generator 36 in a surface plasmon mode. Further, the propagative edge 360 plays a role of propagating the surface plasmon excited by the waveguide light 53b to the NFL-generating end surface 36a. Here, side surfaces of the waveguide 35 are defined as, out of end surfaces surrounding the waveguide 35, end surfaces other than the end surface 350 on the head end surface 2210 side and the light-receiving end surface 352 on the opposite side. The buffering portion 50 may be a portion of the overcoat layer 38 (FIG. 2), or may be provided as a new layer other than the overcoat layer 38.

Specifically, the waveguide light 53b, which has advanced to near the buffering portion 50, is involved with the optical configuration including the waveguide 35 with a refractive index $n_{WG}$, the buffering portion 50 with a refractive index $n_{BF}$ and the surface plasmon generator 36 made of a metal, and induces a surface plasmon mode on the propagative edge 360 of the surface plasmon generator 36. That is, the waveguide light couples with the surface plasmon generator 36 in a surface plasmon mode. The induction of the surface plasmon mode becomes possible by setting the refractive index $n_{BF}$ of the buffering portion 50 to be smaller than the index $n_{WG}$ of the waveguide 35 ($n_{BF} < n_{WG}$). Here, the propagative edge 360 is located closest to the waveguide 35 on the inclined lower surface 362 of the surface plasmon generator 36, and is just an edge where electric field tends to converge; thus surface plasmon can easily be excited on the edge 360 in the surface plasmon mode. In the light source and optical system as shown in FIGS. 1 to 3, the laser light emitted from the light-emission surface 400 of the laser diode 40 preferably has TM-mode polarization in which the oscillation direction of electric field of the laser light is along Z-axis.

Further, as shown also in FIG. 3, the surface plasmon generator 36 has, in the present embodiment, a cross-section taken by YZ plane with a triangular shape, and the NFL-generating end surface 36a especially has an isosceles triangle shape in which one apex on the leading side (−Z side) is the end of the propagative edge 360. Thus, surface plasmon 60 propagating on the propagative edge 360 reaches the NFL-generating end surface 36a having an apex 360a as a destination of the edge 360. As a result, the surface plasmon 60, namely, electric field converges in the NFL-generating end surface 36a. Thereby NF-light 62 is emitted from the end surface 36a toward the magnetic recording layer of the magnetic disk 10 (FIG. 6), and reaches the surface of the magnetic disk 10 to heat a portion of the magnetic recording layer of the disk 10. This heating reduces the anisotropic magnetic field (coercive force) of the portion to a value with which write operation can be performed. Immediately after the heating, write field 63 generated from the main magnetic pole 3400 is applied to the portion to perform write operation. Thus, the thermally-assisted magnetic recording can be accomplished.

Further, the side surfaces of the waveguide 35: the upper surface 354, the lower surface 353, and both the side surfaces 351 in the track width direction (Y-axis direction) have a surface contact with the overcoat layer 38, that is, the insulating layers 384 and 385, except a portion having a surface contact with the buffering portion 50. Here, the waveguide 35 is formed of a material with a refractive index $n_{WG}$ higher than the refractive index $n_{OC}$ of the constituent material of the overcoat layer 38, made by using, for example, a sputtering method. This material design causes the waveguide 35 to act as a core, and causes the overcoat layer 38 to act as a clad. For example, in the case that the wavelength $\lambda_L$ of the laser light is 600 nm and the overcoat layer 38 is formed of $Al_2O_3$ (n=1.63), the waveguide 35 can be formed of, for example, $SiO_xN_Y$ (n=1.7-1.85) or $Ta_2O_5$ (n=2.16). The width $W_{WG}$ in the track width direction (Y-axis direction) of a portion of the waveguide 35 near the end surface 350 on the head end surface 2210 side may be, for example, in the range approximately from 0.3 to 0.7 μm. Further, the thickness $T_{WG}$ (in Z-axis direction) of the waveguide 35 may be, for example, in the range approximately from 0.3 to 0.7 μm.

The buffering portion 50 is formed of a dielectric material having a refractive index $n_{BF}$ lower than the refractive index $n_{WG}$ of the waveguide 35. For example, when the wavelength $\lambda_L$ of the laser light is 600 nm and the waveguide 35 is formed of $Ta_2O_5$ (n=2.16), the buffering portion 50 can be formed of $SiO_2$ (n=1.46) or $Al_2O_3$ (n=1.63). Further, the length $L_{BF}$ (in X-axis direction) of the buffering portion 50, namely, the length of a portion sandwiched between the side surface 354 of the waveguide 35 and the propagative edge 360, is preferably in the range of 0.5 to 5 μm, and is preferably larger than the wavelength $\lambda_L$ of the laser light 53b. Further, the thickness $T_{BF}$ (in Z-axis direction) of the buffering portion 50 is preferably in the range of 10 to 200 nm.

The surface plasmon generator 36 is preferably formed of a conductive material of, for example, a metal such as Ag, Au, pd, Pt, Rh, Ir, Ru, Cu or Al, or an alloy made of at least two of these elements, especially an alloy with Ag as a main component. Further, the surface plasmon generator 36 can have a width $W_{NF}$ in the track width direction (Y-axis direction) of the upper surface 361, the width $W_{NF}$ being sufficiently smaller than the wavelength of the laser light 53b, and being in the range of, for example, approximately 10 to 100 nm. And the surface plasmon generator 36 can have a thickness $T_{NF1}$ (in Z-axis direction) sufficiently smaller than the wavelength of the laser light 53b, the thickness $T_{NF1}$ being in the range of, for example, approximately 10 to 100 nm. Further, the length (height) $H_{NF}$ (in X-axis direction) can be set to be in the range of, for example, approximately 0.8 to 6.0 μm.

The optical system that is provided in the head element part 221 and generates light for thermal assist is not limited to the above-described one. For example, as an alternative, there can be available an optical system that use a NF-light generator having another shape and structure, or an optical system in which a plasmon antenna made of a metal piece is provided at the end of a waveguide.

Figure 4A:
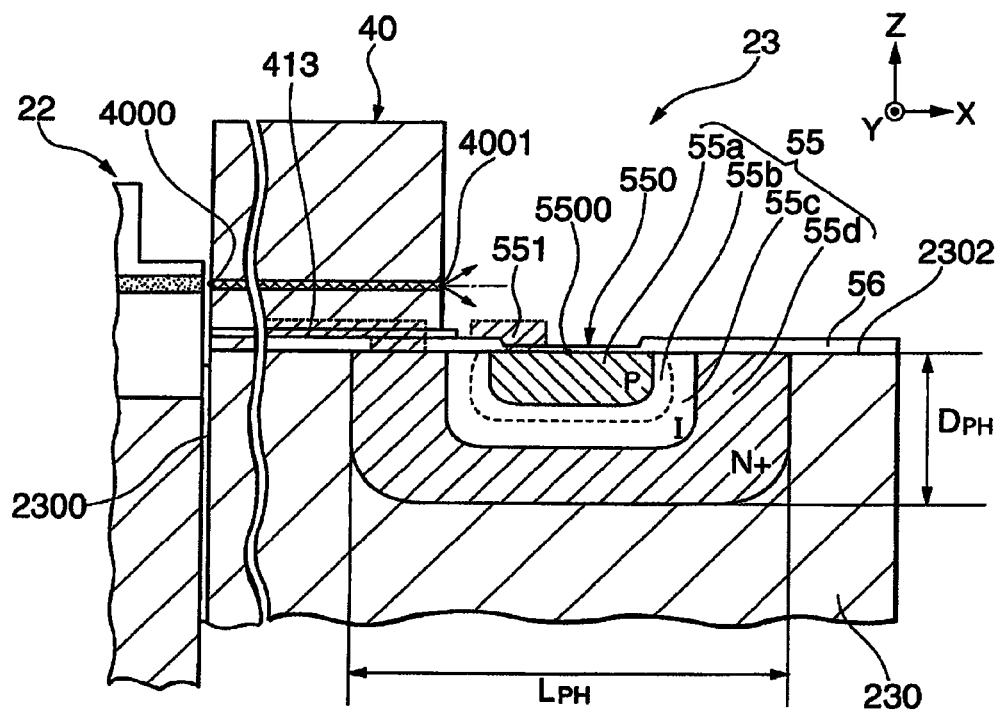
FIG. 4a shows a cross-sectional view taken by plane A in FIG. 1, schematically illustrating a configuration of the photodiode section and its surrounding in the light source unit of the thermally-assisted magnetic recording head according to the present invention.
Figure 4B:
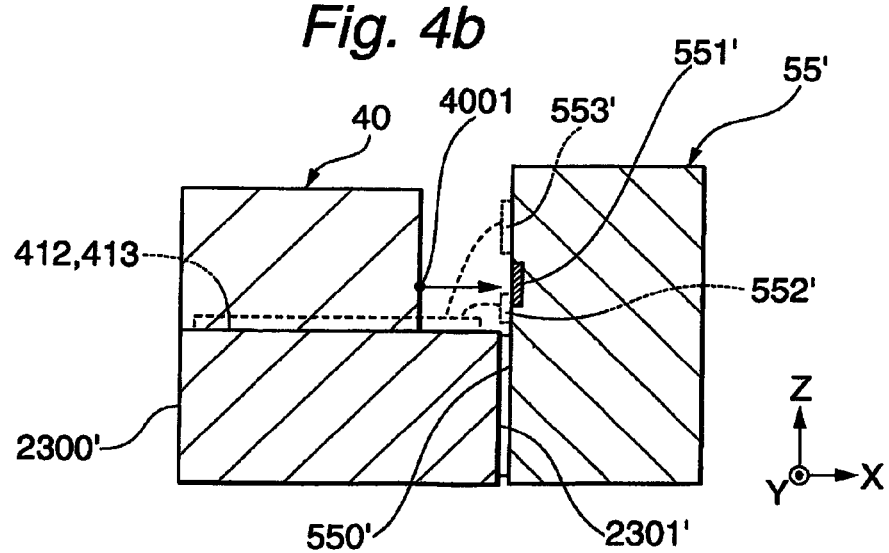
FIG. 4b shows a cross-sectional view schematically illustrating another embodiment of the photodetector of the light source unit.

FIG. 4a shows a cross-sectional view taken by plane A in FIG. 1, schematically illustrating a configuration of the photodiode section 55 and its surrounding in the light source unit 23 of the thermally-assisted magnetic recording head 21. FIG. 4b shows a cross-sectional view schematically illustrating another embodiment of the photodetector of the light source unit 23.

As illustrated in FIG. 4a, the photodiode section 55 is a semiconductor photodiode structure formed from a portion of the unit substrate 230 and is contained inside the unit substrate 230. The photodiode section 55 is located on the rear side (on +X side) of the laser diode 40 when viewed from the joining surface 2300 side of the unit substrate 230.

The photodiode section 55 has a PIN-type photodiode structure in the present embodiment and includes a p-type semiconductor portion 55a, an n-type semiconductor portion 55d with highly-doped impurity, and an intrinsic portion 55c which is provided between the p-type semiconductor portion 55a and the n-type semiconductor portion 55d and has a very low impurity concentration. The p-type semiconductor portion 55a is located close to the source-installation surface 2302. The upper surface of the p-type semiconductor portion 55a is in plane with the source-installation surface 2302 and forms the light-receiving portion 550. The p-electrode 551 is electrically connected to the p-type semiconductor portion 55a. The end potion of the n-type semiconductor part 55d also reaches the source-installation surface 2302. The second lead electrode 413 is electrically connected to the n-type semiconductor portion 55d. In an alternative, the photodiode section 55 may have a PN-junction diode structure including a PN-junction of a p-type semiconductor portion and an n-type semiconductor portion.

However, the provision of the intrinsic portion 55c widens the width of a depletion layer in the PIN-type photodiode structure of the present embodiment and therefore parasitic capacitance can be minimized. Consequently, a higher sensitivity and a higher response speed can be achieved compared with the PN-junction diode structure. In FIG. 4a, when a reverse bias is applied to the photodiode section 55, that is, a positive voltage is applied to the second lead electrode 413 with the p-electrode 551 grounded, for example, a wide depletion layer 55b is generated due to the presence of the intrinsic portion 55c. Here, when laser light (monitor light) from the rear light-emission center 4001 of the laser diode 40 enters the photodiode section 55 where the depletion layer 55b is produced through the light-receiving portion 550, a photoelectric effect occurs and a quantity of electron-hole pairs that is dependent on the amount of the light is generated. The electrons of the pairs flow into the n-type semiconductor portion 55d and the holes flow into the p-type semiconductor portion 55a. As a result, photovoltaic power that is dependent on the amount of incident light is generated between electrodes 551 and 413. By measuring the photovoltaic power or by connecting a load between the electrodes 551 and 413 to measure a current flowing through the load, a monitor output from the photodiode section 55 can be obtained.

While the photodiode section 55 can be formed by embedding a photodiode chip in the unit substrate 230, the photodiode section 55 is preferably formed from a portion of the unit substrate 230 by using a conventional technique that utilizes photolithography, ion implantation and so on to form a photodiode structure on a silicon wafer. This forming method involves fewer elements to form and is low-cost compared with the method of embedding the chip, and the problem of mechanical stress during mounting can be circumvented. Here, the length $L_{PH}$ (in X-axis direction) of the photodiode section 55 may be in the range of, for example, approximately 50 to 150 μm, the depth $D_{PH}$ (in Z-axis direction) may in the range of, for example, approximately 5 to 50 μm, and the width $W_{PH}$ (in Y-axis direction) (FIG. 1) may be in the range of, for example, approximately 50 to 150 μm.

Alternatively, as illustrated in FIG. 4b, a photodiode 55' which is a semiconductor chip, may be bonded to the rear joining surface 2301' on the side opposite to the joining surface 2300' of a unit substrate 230', instead of providing the photodiode section 55 formed from a portion of the unit substrate 230. The photodiode 55' is of a type in which a light-receiving surface 551' and two electrodes 552' and 553' are located on the mounting surface (bottom surface) 550'. The photodiode 55' is provided in a position where the photodiode 55' can receive laser light emitted from the rear light-emission center 4001 of the laser diode 40 at its light-receiving surface 551'. The two electrodes 552' and 553' of the photodiode 55' are exposed and can be electrically connected to the first and second lead electrodes 412 and 413, respectively, by a method such as wire bonding or SBB.

Figure 5:
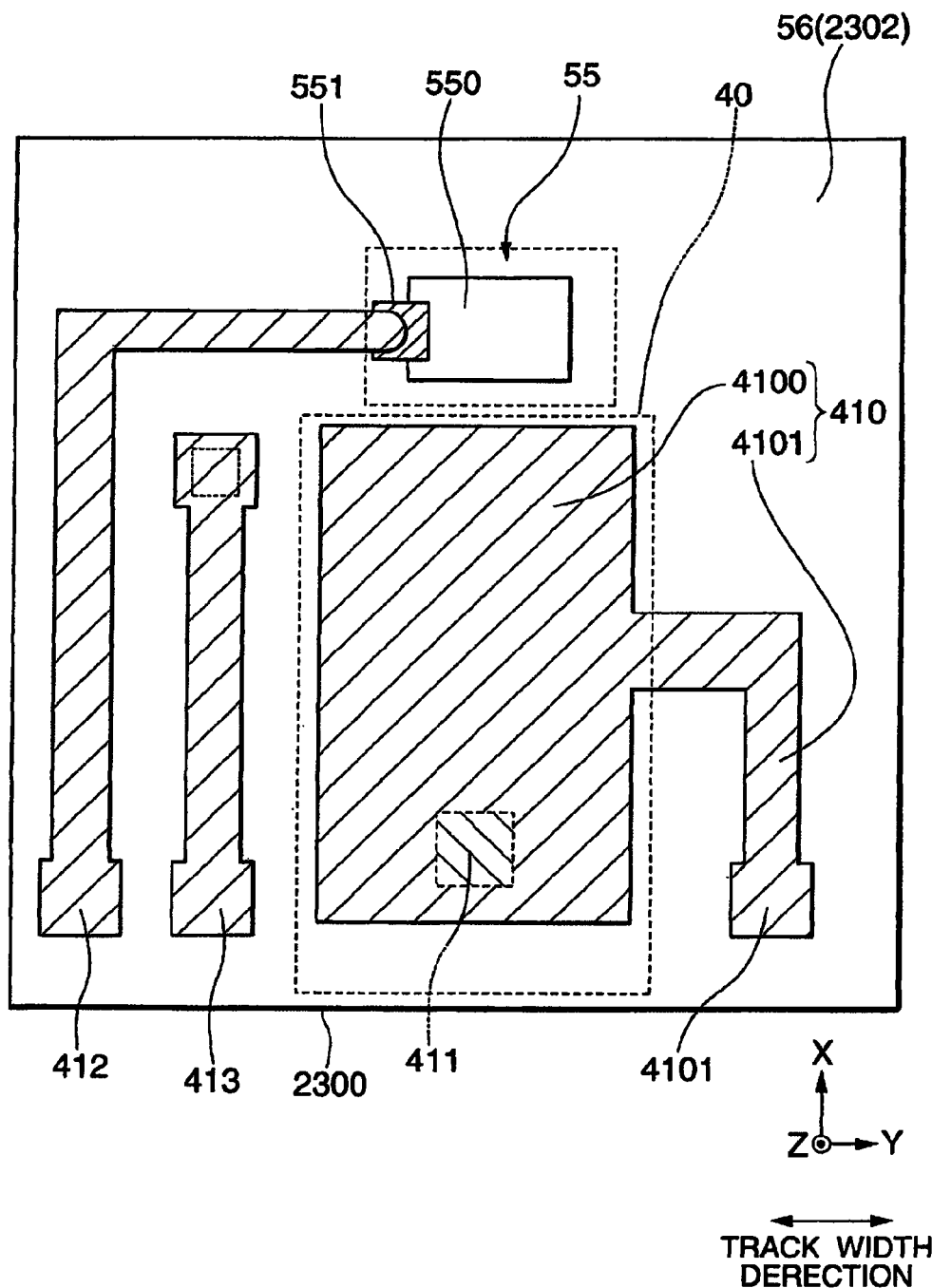
FIG. 5 shows a schematic view illustrating an embodiment of design of electrodes provided on the source-installation surface of the light source unit.

FIG. 5 shows a schematic view illustrating an embodiment of design of electrodes provided on the source-installation surface 2302 of the light source unit 23.

Referring to FIG. 5, an insulation layer 56 of an insulating material such as $SiO_2$ or $Al_2O_3$ is provided on the source-installation surface 2302. The first lead electrode 412 and the second lead electrode 413, which are two electrodes for the photodiode section 55, and the light-source lead electrode 410, which is one electrode for the laser diode 40, are provided on the insulation layer 56. The first lead electrode 412 is electrically connected to the p-electrode 551 of the photodiode section 55, and a portion of the second lead electrode 413 passes through the insulation layer 56 and is electrically connected to the n-type semiconductor portion 55*d* of the photodiode section 55. The light-source lead electrode 410 includes a light-source electrode part 4100 and a lead part 4101. The light-source terminal electrode 411, which is another electrode for the laser diode 40, is provided on (the n-electrode layer 40*a* of) the laser diode 40.

The first and second lead electrodes 412 and 413 and the light-source lead electrode 410 can be constituted by a foundation layer made of a material such as Ta or Ti with a thickness of approximately 10 nm, for example, and a conductive layer made of a conductive material such as Au, Cu, Al or an alloy containing at least one of these elements with a thickness in the range of approximately 1 to 5 µm, for example. Alternatively, the lead electrodes can be formed by depositing a solder material, for example Au—Sn alloy, on the insulation layer 56 formed on the source-installation surface 2302 by a method such as evaporation. The light-source terminal electrode 411 may be a conductive layer made of a material such as Au, Cu, Al or an alloy containing at least one of these elements, formed on the n-electrode layer 40*a* (FIG. 2) of the laser diode 40 with a thickness in the range of approximately 1 to 5 µm, for example.

The first lead electrode 412, the second lead electrode 413, the light-source terminal electrode 411, and the lead part 4101 extend to near the joining surface 2300 or are located near the joining surface 2300, and are aligned in this order toward +Y direction. This four-terminal-electrode pattern enables an appropriate electrical connection between these electrodes and the connection pads of the wiring members of the flexure 201 when the thermally-assisted magnetic recording head 21 is joined to the suspension 30 (FIG. 8*a*) to form an HGA, as will be described later.

Figure 6:
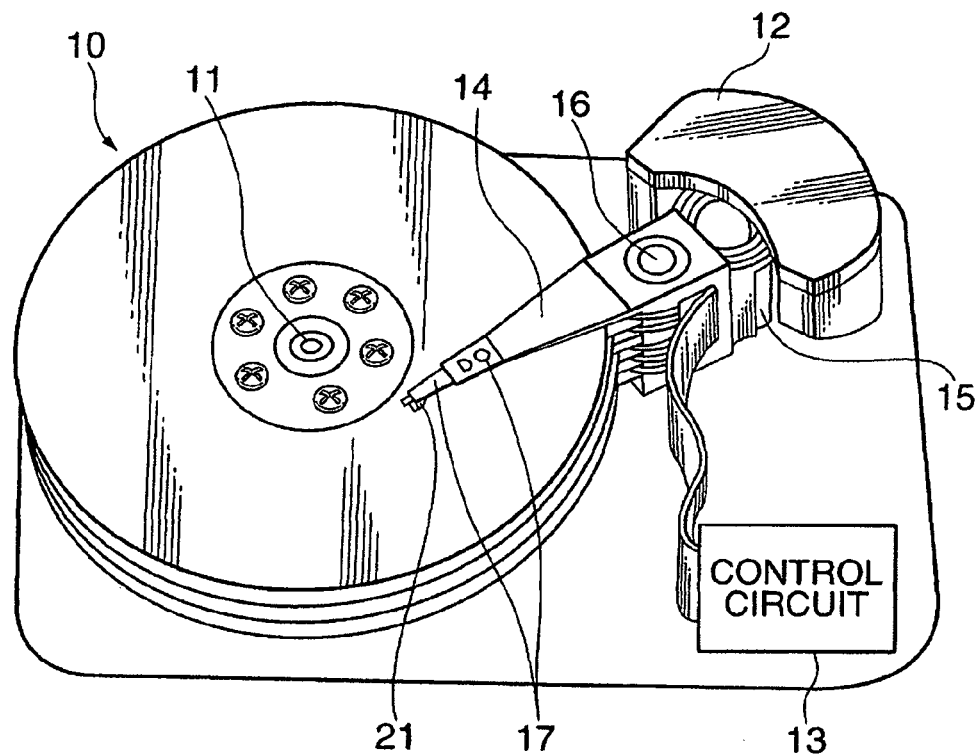
FIG. 6 shows a perspective view schematically illustrating a structure of a major part in one embodiment of a magnetic disk apparatus according to the present invention.

FIG. 6 shows a perspective view schematically illustrating a structure of a major part in one embodiment of a magnetic disk apparatus according to the present invention.

A magnetic disk apparatus as a magnetic recording apparatus shown in FIG. 6 includes: a plurality of magnetic disks 10 rotating around a rotational axis of a spindle motor 11; an assembly carriage device 12 provided with a plurality of drive arms 14 thereon; an HGA 17 attached on the top end portion of each drive arm 14 and provided with a thermally-assisted magnetic recording head 21; and a recording/reproducing and light-emission control circuit 13 for controlling write/read operations of the thermally-assisted magnetic recording head 21 and further for controlling the emission operation of the laser diode 40 based on monitoring output generated from the photodiode section 55 included in the head 21.

The magnetic disk 10 is, in the present embodiment, designed for perpendicular magnetic recording, and has a structure in which, for example, sequentially stacked on a disk substrate is: a soft-magnetic under layer; an intermediate layer; and a magnetic recording layer (perpendicular magnetization layer). The assembly carriage device 12 is a device for positioning the thermally-assisted magnetic recording head 21 above a track formed on the magnetic recording layer of the magnetic disk 10, on which recording bits are aligned. In the apparatus, the drive arms 14 are stacked in a direction along a pivot bearing axis 16 and can be angularly swung around the axis 16 by a voice coil motor (VCM) 15. The structure of the magnetic disk apparatus according to the present invention is not limited to that described above. For instance, the number of each of magnetic disks 10, drive arms 14, HGAs 17 and sliders 21 may be one.

Figure 7:
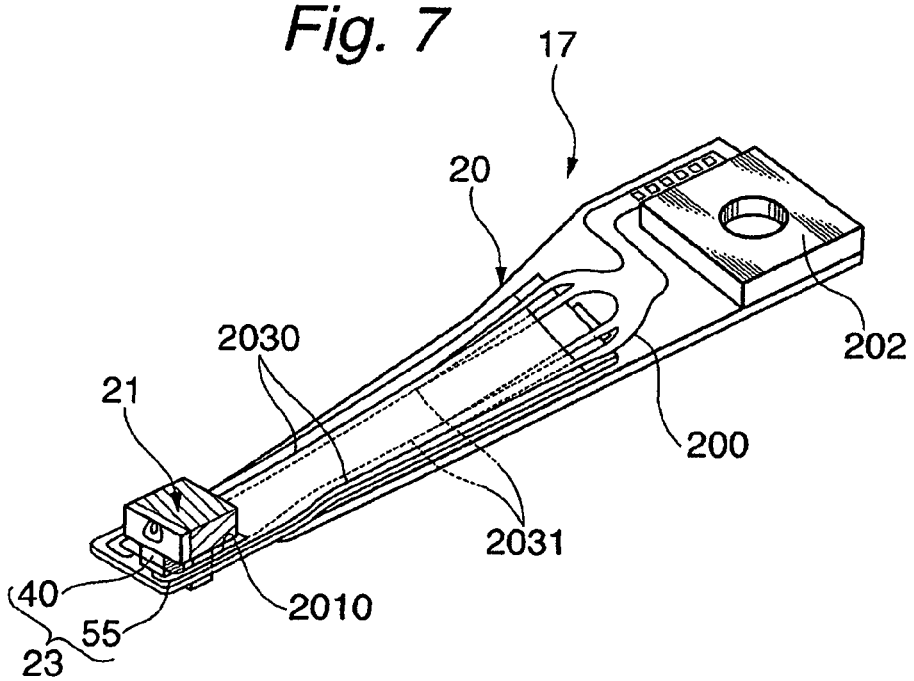
FIG. 7 shows a perspective view schematically illustrating a structure of a major part in one embodiment of the HGA according to the present invention.

FIG. 7 shows a perspective view schematically illustrating a structure of a major part in one embodiment of the HGA 17 according to the present invention. In the figure, the side of the HGA 17 opposed to the surface of the magnetic disk 10 is presented as the upper side.

Referring to FIG. 7, a suspension 20 in the HGA 17 includes a load beam 200, a flexure 201 fixed to the load beam 200, a base plate 202 provided on the base portion of the load beam 200, and wiring members 2030 and 2031 provided on a surface of the flexure 201 opposed to the magnetic disk 10. The flexure 201 is a plate with elasticity formed of such as a stainless steel. The wiring member 2030 is the first wiring member for the laser diode 40 and the photodiode section 55. The wiring member 2031 is the second wiring member for the MR element 33 and the electromagnetic transducer 34. Each of the wiring members 2030 and 2031 includes plural lead conductors and connection pads electrically joined to both ends of the lead conductors.

The thermally-assisted magnetic recording head 21 is fixed to the flexure 201 at the top end portion of the suspension 20 so as to face the surface of each magnetic disk 10 with a predetermined space (flying height). In the flexure 201, there is provided an opening (cutout portion) 2010; the thermally-assisted magnetic recording head 21 is fixed in such a way that the light source unit 23 as a part of the head 21 protrudes through the aperture 2010 on the opposite side of the flexure 201.

Figures 8A, 8B:
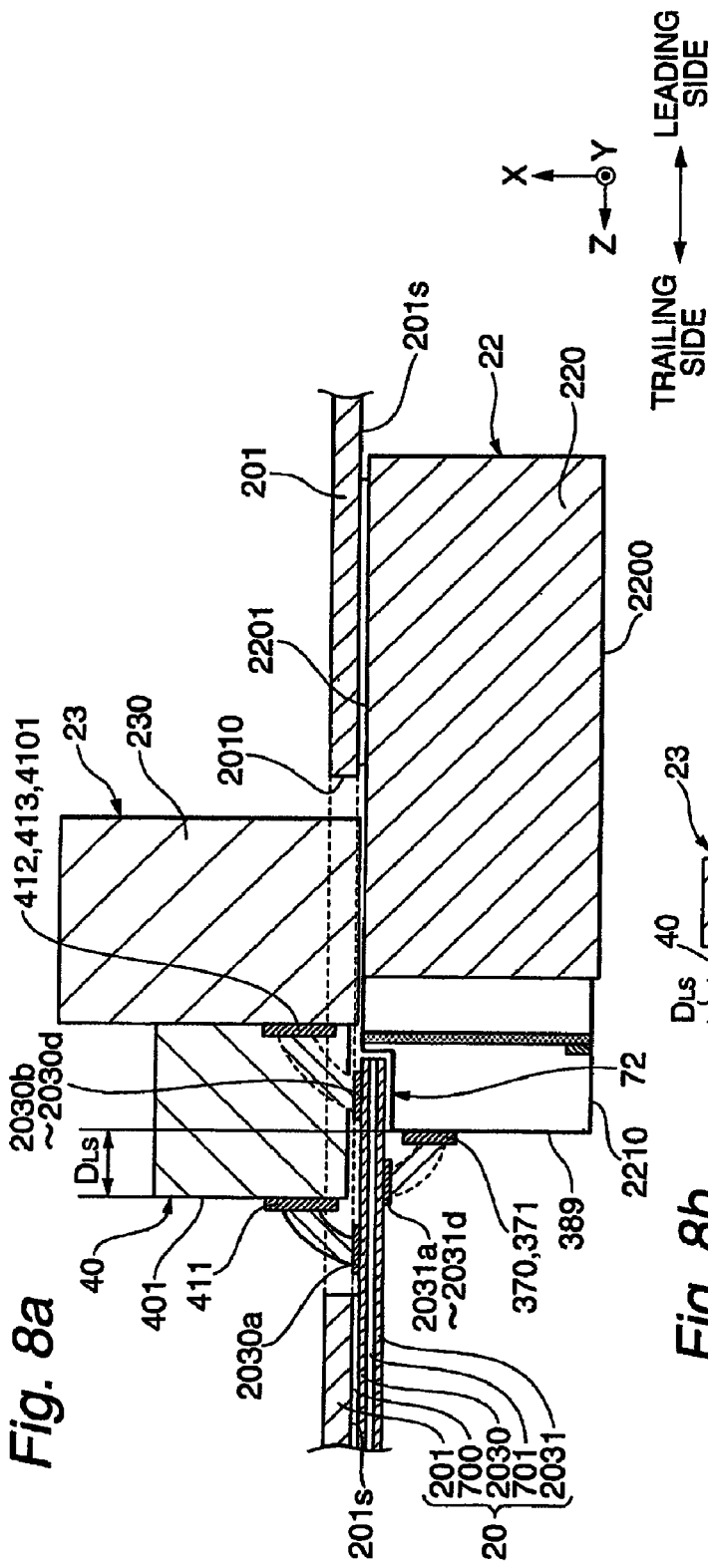
FIG. 8a shows a cross-sectional view taken by ZX-plane, schematically illustrating one embodiment of connection between the suspension and the thermally-assisted magnetic recording head in the HGA according to the present invention.
FIG. 8b shows a cross-sectional view taken by ZX-plane, illustrating a comparative example in which a suspension having wiring members on both faces of a flexure is used.

FIG. 8*a* shows a cross-sectional view taken by ZX-plane, schematically illustrating one embodiment of connection between the suspension 20 and the thermally-assisted magnetic recording head 21 in the HGA 17 according to the present invention. FIG. 8*b* shows a cross-sectional view taken by ZX-plane, illustrating a comparative example in which a suspension 20' having wiring members on both faces of a flexure 201' is used.

Referring to FIG. 8*a*, the thermally-assisted magnetic recording head 21 is fixed onto the suspension 20 in such a manner that the back surface 2201 of the slider substrate 220 and the surface 201*s* of the flexure 201 that faces a magnetic disk are joined together. The light source unit 23 protrudes toward the side opposite to the surface 201*s* of the flexure 201 through an opening (hole) in the suspension 20.

The flexure 201 is a base made of a material such as stainless steel. A first insulating section 700 which covers the flexure 201 is provided on the surface 201*s* of the flexure 201, the first wiring member 2030 is provided on the first insulating section 700, a second insulating section 701 which covers the first wiring member 2030 is provided on the first wiring member 2030, and the second wiring member 2031 is provided on the second insulating section 701. Here, the first and second insulating sections 700 and 701 are made of an insulating material such as polyimide and have a thickness of in the range of approximately 20 to 40 µm, for example. The first and second wiring members 2030 and 2031 are made of a conductive material such as Cu and have a thickness in the range of approximately 3 to 10 µm, for example. It is also preferable that a flexible printed circuit board having a multilayered (two-layered) wiring structure into which the first insulating section 700, the first wiring member 2030, the second insulating section 701 and the second wiring member 2031 are integrated may be fixed on the flexure 201 to form the suspension 20.

The suspension 20 has an opening (cutout portion) 2010. The thermally-assisted magnetic recording head 21 is fixed to the flexure 201 to fit in the opening 2010. In the opening 2010, the first wiring member 2030, the second insulating section 701, and the second wiring member 2031 protrude from the flexure 201 toward the head 21 in the opening 2010. Among these protruding elements, at least the second insulating section 701 and the second wiring member 2031 (and the first wiring member 2030 in the present embodiment) further protrude into the indentation 72 provided in a portion of the overcoat layer 38 provided on the slider 22, the portion being on the side opposite to the head end surface 2210.

Since the first wiring member 2030 protrudes as described above, a connection pad 2030a of the wiring member 2030 can be located close to the light-source terminal electrode 411 for the laser diode 40, and connection pads 2030b to 2030d of the wiring member 2030 can be located close to the lead part 4101 for laser diode 40 and the first and second lead electrodes 412 and 413 for the photodiode section 55. This arrangement enables the connection pads 2030a to 2030d to be reliably electrically connected to the corresponding electrodes by solder ball bonding (SBB). The SBB enables connections that are more reliable, stable, and resistant to mechanical impact than wire bonding, for example.

Similarly, since the second wiring member 2031 protrudes as described above, connection pads 2031a to 2031d of the wiring member 2031 can be located close to the terminal electrodes 370 for the MR element 33 and the terminal electrodes 371 for the electromagnetic transducer 34. This arrangement enables the connection pads 2031a to 2031d to be reliably electrically connected to the corresponding electrodes by SBB.

For comparison, the comparative example using a conventional two-layered wiring suspension 73 illustrated in FIG. 8b will be considered. The two-layered wiring suspension 73 includes a substrate 731 and coating layers 740 and 741 which coat the substrate 731 and also includes wiring member 7330 on the coating layer 740 and wiring member 7331 on the coating layer 741. The wiring member 7331 is provided on the surface of the substrate 731 that is opposite to the surface on which the wiring member 7330 is provided. In the comparative example, a connection pad 7331a of the wiring member 7331 is so distant from the terminal electrodes 370 and 371 that it is very difficult to connect the connection pad 7331a to the terminal electrodes 370 and 371 by SBB. This is because the laser diode 40 is fixed onto the unit substrate 230 with the p-electrode layer 40i as the bottom joined to the light-source electrode part 4100, and accordingly the distance $D_{LS}$ between the upper surface 401 of the laser diode 40 and the upper surface 389 of the overcoat layer 38 of the slider 22 in Z-axis direction is as large as approximately 35 to 40 μm, for example.

By placing the laser diode 40 with the p-electrode layer 40i at the bottom, the position of the light-receiving section 550 can be readily designed so that laser light (monitor light) emitted from and around the rear light-emission center 4001 can be sufficiently incident on the light-receiving section 550 of the photodiode section 55, as has been described previously. Furthermore, with the p-electrode layer 40i at the bottom, the unit substrate 230 can be used as a heatsink to adequately dissipate heat generated from the laser diode 40.

In the suspension 20 of the present invention, both of the wiring members 2030 and 2031 are provided on the surface 201s of the flexure 201 that faces a magnetic disk 10 and protrude from the flexure 201 into the indentation 72 of the head 21. Consequently, the wiring members 2030 and 2031 can be appropriately electrically connected to all electrodes on the head 21 by SBB even under the condition that the laser diode 40 is placed with the p-electrode layer 40i at the bottom and the distance $D_{LS}$ is significantly large.

Figure 9:
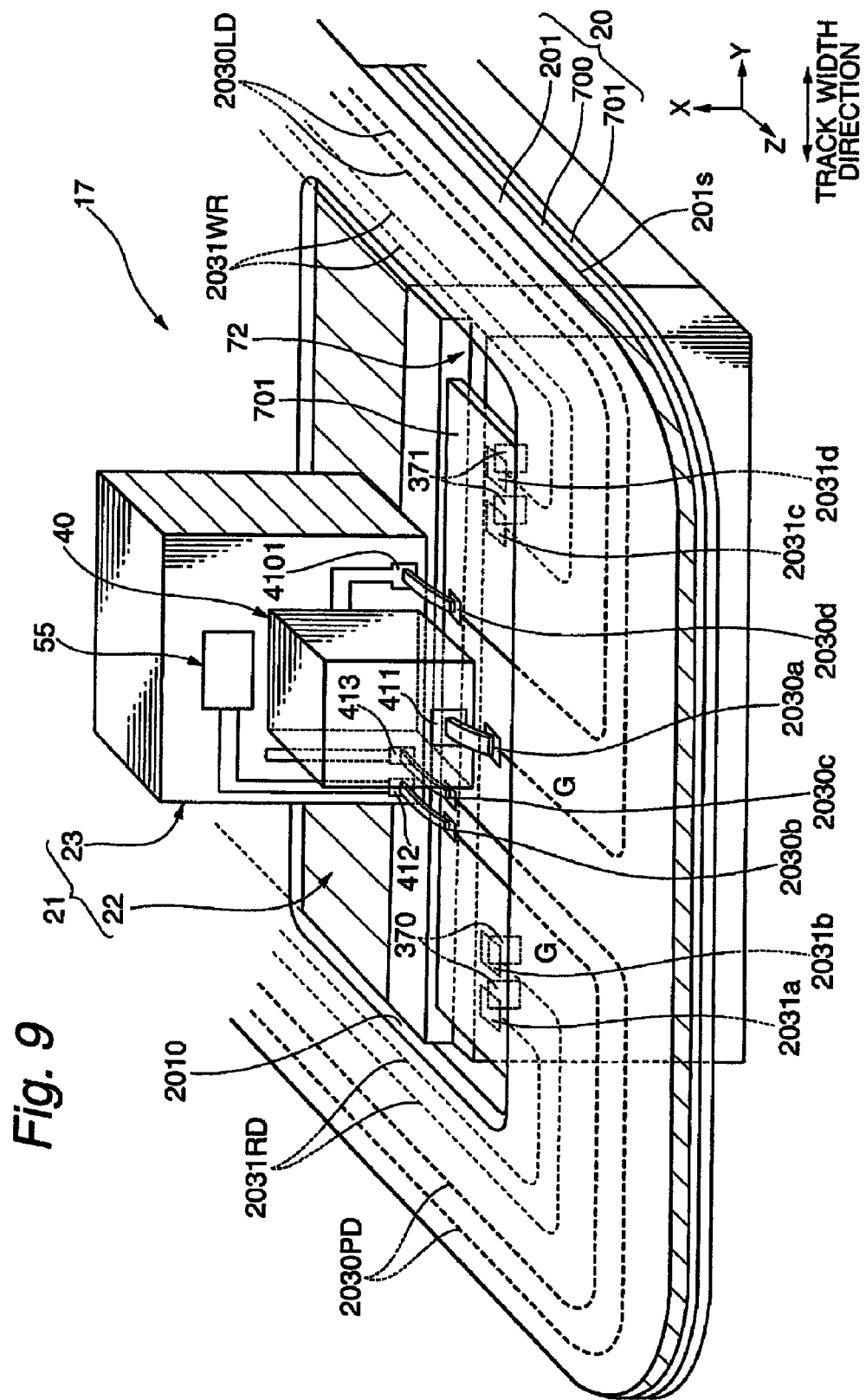
FIG. 9 shows a perspective view schematically illustrating one embodiment of connection between the wiring members of the suspension and electrodes of the thermally-assisted magnetic recording head in the HGA according to the present invention.

FIG. 9 shows a perspective view schematically illustrating one embodiment of connection between the wiring members of the suspension 20 and electrodes of the thermally-assisted magnetic recording head 21 in the HGA 17 according to the present invention. The figure is a perspective view of the connection from obliquely above the surface of the flexure 201 opposite to the surface 201s that faces the magnetic disk 10.

Referring to FIG. 9, the wiring member 2030 provided on the surface 201s of the flexure 201 separately extends from two directions as wiring members 2030PD and 2030LD around the thermally-assisted magnetic recording head 21 toward electrodes of the head 21. The wiring member 2030PD extending from the left (−Y side) of the head 21 in FIG. 9 includes two lead conductors electrically connected to the connection pads 2030b and 2030c. On the other hand, the wiring member 2030LD extending from the right (+Y side) of the head 21 in FIG. 9 includes two lead conductors electrically connected to the connection pad 2030a and 2030d.

In the suspension 20, the wiring member 2030PD and the wiring member 2030LD protrude from the flexure 201 into the indentation 72 of the head 21 along with the second insulating section 701. Consequently, the connection pads 2030a and 2030d can be located close to the light-source terminal electrode 411 and the lead part 4101 for the laser diode 40, respectively, as illustrated in FIG. 9. Similarly, the connection pads 2030b and 2030c can be located close to the first and second lead electrodes 412 and 413 for the photodiode section 55, respectively. This arrangement enables reliable electrical connection between the connection pads 2030a to 2030d and their corresponding electrodes by SBB.

Referring again to FIG. 9, the wiring member 2031 provided on the surface 201s of the flexure 201 extends separately from two directions as wiring members 2031RD and 2031WR around the thermally-assisted magnetic recording head 21 toward electrodes of the head 21. Here, the wiring member 2031RD extending from the left (−Y side) of the head 21 in FIG. 9 includes two lead conductors electrically connected to the connection pads 2031a and 2031b. On the other hand, the wiring member 2031WR extending from the right (+Y side) of the head 21 in FIG. 9 includes two lead conductors electrically connected to the connection pads 2031c and 2031d.

Furthermore, in the suspension 20, the wiring members 2031RD and 2031WR protrude from the flexure 201 into the indentation 72 of the head 21 along with the second insulating section 701. Consequently, the connection pads 2031a and 2031b can be located close to the terminal electrodes 370 for the MR element 33, as illustrated in FIG. 9. In addition, the connection pads 2031c and 2031d can be located close to the terminal electrodes 371 for the electromagnetic transducer 34. This arrangement enables reliable electrical connection between the connection pads 2031a to 2031d and their corresponding electrodes by SBB.

As also shown in FIG. 9, the wiring members 2030PD, 2030LD, 2031RD and 2031WR preferably are at a distance from one another without overlapping one another as viewed from above the surface of the flexure 201 opposite to the surface 201s. This is also obviously true when viewed from above the surface 201s of the flexure 201. Furthermore, as illustrated in FIG. 9, the wiring member 2030PD for the photodiode section 55 and the wiring member 2031WR for the electromagnetic transducer 34 are preferably provided at the greatest distance apart from each other among all the wiring members. Here, the wiring members 2030PD and 2030LD are at the greatest distance from each other near the sides in the track width direction of the head 21 but close to each other near the connection pads 2030a to 2030d. Therefore, the wiring members 2030PD and 2030LD are not at the greatest distance from each other among all wiring members.

The arrangement of the wiring members 2030 and 2031 (the wiring members 2030PD, 2030LD, 2031RD and 2031WR) described above can avoid superimposition of noise on outputs from the elements in the head 21 caused by crosstalk between these wiring members through which currents (signals) are flowing. The most serious crosstalk effect is that the wiring member 2030PD for the photodiode section 55 picks up a high-frequency signal component generated by driving of the electromagnetic transducer 34 and flowing through the wiring member 2031WR, and noise corresponding to the high-frequency signal component (crosstalk component) is superimposed on an output from the photodiode section 55. Such noise adversely affects feedback control of light output from the laser diode 40, which uses the output from the photodiode section 55, and can hinder constant proper thermal-assist operation. The embodiment in FIG. 9 can solve the serious crosstalk problem because the wiring members 2030PD and 2031WR are provided at a sufficient distance from each other.

In FIG. 9, preferably one of the lead conductors of the wiring member 2030PD that is connected to the connection pad 2030b (the first lead electrode 412) is grounded and one of the lead conductors of the wiring member 2030LD that is connected to the connection pad 2030a (the light-source terminal electrode 411) is also grounded. In other words, the grounded lead conductor for the photodiode section 55 and the grounded lead conductor for the laser diode 40 are provided independently of each other. An advantage of the use of the four-terminal electrical connection including the two independent grounded lead conductors for the laser diode 40 and the photodiode section 55 will be described below with reference to FIGS. 10a and 10b.

Figure 10A:
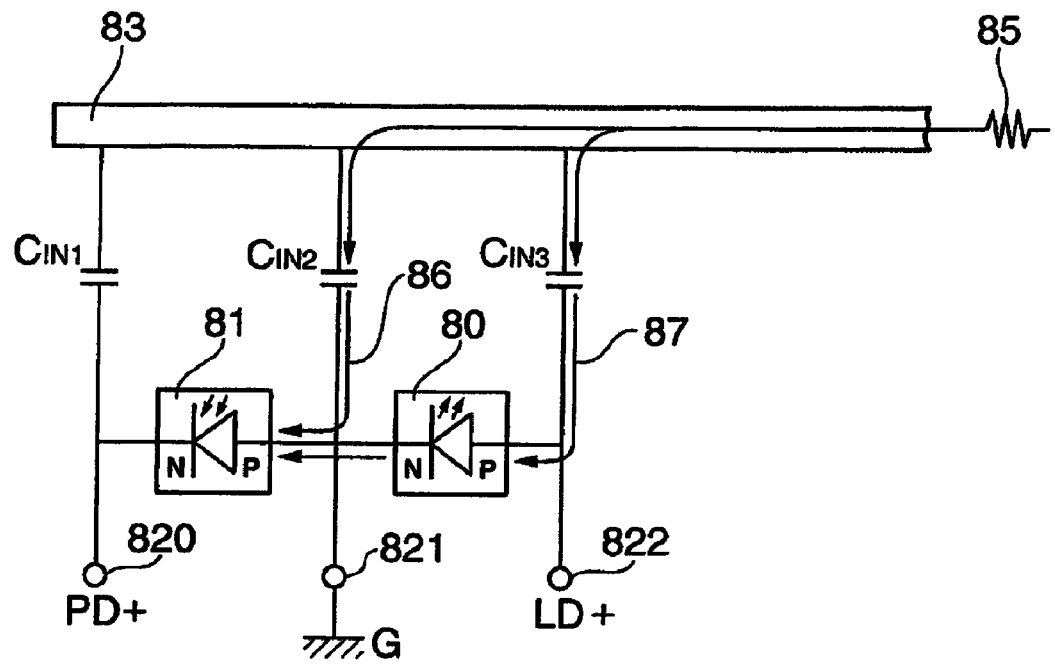
FIG. 10a shows a circuit diagram schematically illustrating three-terminal connection (comparative example) in which a common ground is provided for electrical connections for a laser diode and a photodiode.
Figure 10B:
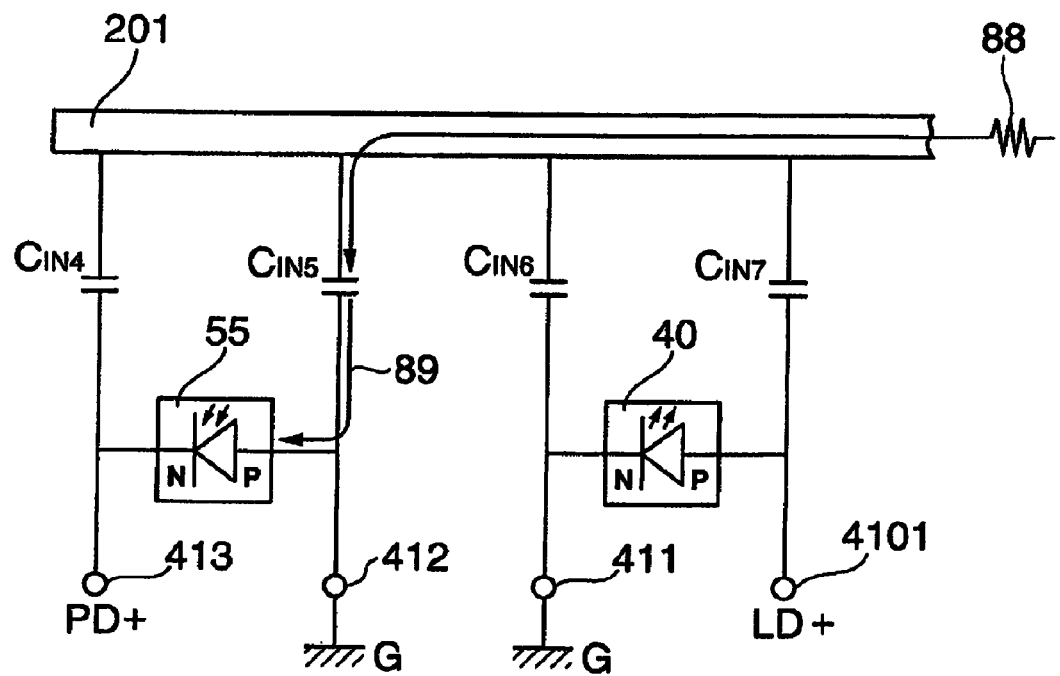
FIG. 10b shows a circuit diagram schematically illustrating four-terminal connection in which independent grounds are provided for electrical connections for a laser diode and a photodiode.

FIG. 10a shows a circuit diagram schematically illustrating three-terminal connection (comparative example) in which a common ground is provided for electrical connections for a laser diode and a photodiode. FIG. 10b shows a circuit diagram schematically illustrating four-terminal connection in which independent grounds are provided for electrical connections for a laser diode and a photodiode.

In the comparative example (the three-terminal connection) illustrated in FIG. 10a, terminal electrodes 820, 821 and 822 are provided for the laser diode 80 and the photodiode section 81. Among these electrodes, the electrode 821 is a common ground terminal electrode for the laser diode 80 and the photodiode section 81. In this case, there are two main paths 86 and 87 through which a crosstalk component 85 flowing through a wiring member 2031WR for an electromagnetic transducer 34 can travel to the photodiode section 81.

In the path 86, the crosstalk component 85 flows through a flexure 83 and a capacitor $C_{IN2}$ to the anode (p-electrode) of the photodiode section 81. In the path 87, the crosstalk component 85 flows through the flexure 83, a capacitor $C_{IN3}$ and the laser diode 80 to the anode of the photodiode section 81. The path 87 is created because of the common ground. The capacitors $C_{IN1}$ to $C_{IN3}$ are each formed by each wiring member, the flexure 83, and an insulating section between them. Since there are two main paths through which the crosstalk component 85 flows to the photodiode section 81 in the comparative example that uses the three-terminal connection, more noise corresponding to the crosstalk component 85 is superimposed on the output from the photodiode section 81.

In contrast, the embodiment that uses four-terminal connection illustrated in FIG. 10b, the light-source terminal electrode 411 and the first lead electrode 412 are provided independently of each other as the ground terminal electrodes for the laser diode 40 and the photodiode section 55, respectively, as described above. In this case, there is only one path 89 through which a crosstalk component 88 flowing through the wiring member 2031WR for the electromagnetic transducer 34 can travel to the photodiode section 55.

In the path 89, the crosstalk component 88 flows through the flexure 201 and a capacitor $C_{IN5}$ to the anode (p-electrode 551) of the photodiode section 55. The embodiment does not include a path that passes through the laser diode 40 because separate ground terminal electrodes are provided. The capacitors $C_{IN4}$ to $C_{IN7}$ are each formed by each of the wiring members 2030PD and 2030LD, the flexure 201, and an insulating section between them. In the present embodiment which uses the four-terminal connection, the path through which the crosstalk component 88 flows to the photodiode section 55 is more limited than the comparative example using the three-terminal connection. Accordingly, noise according to the crosstalk component 88 superimposed on the output from the photodiode section 55 is reduced.

Figure 11:
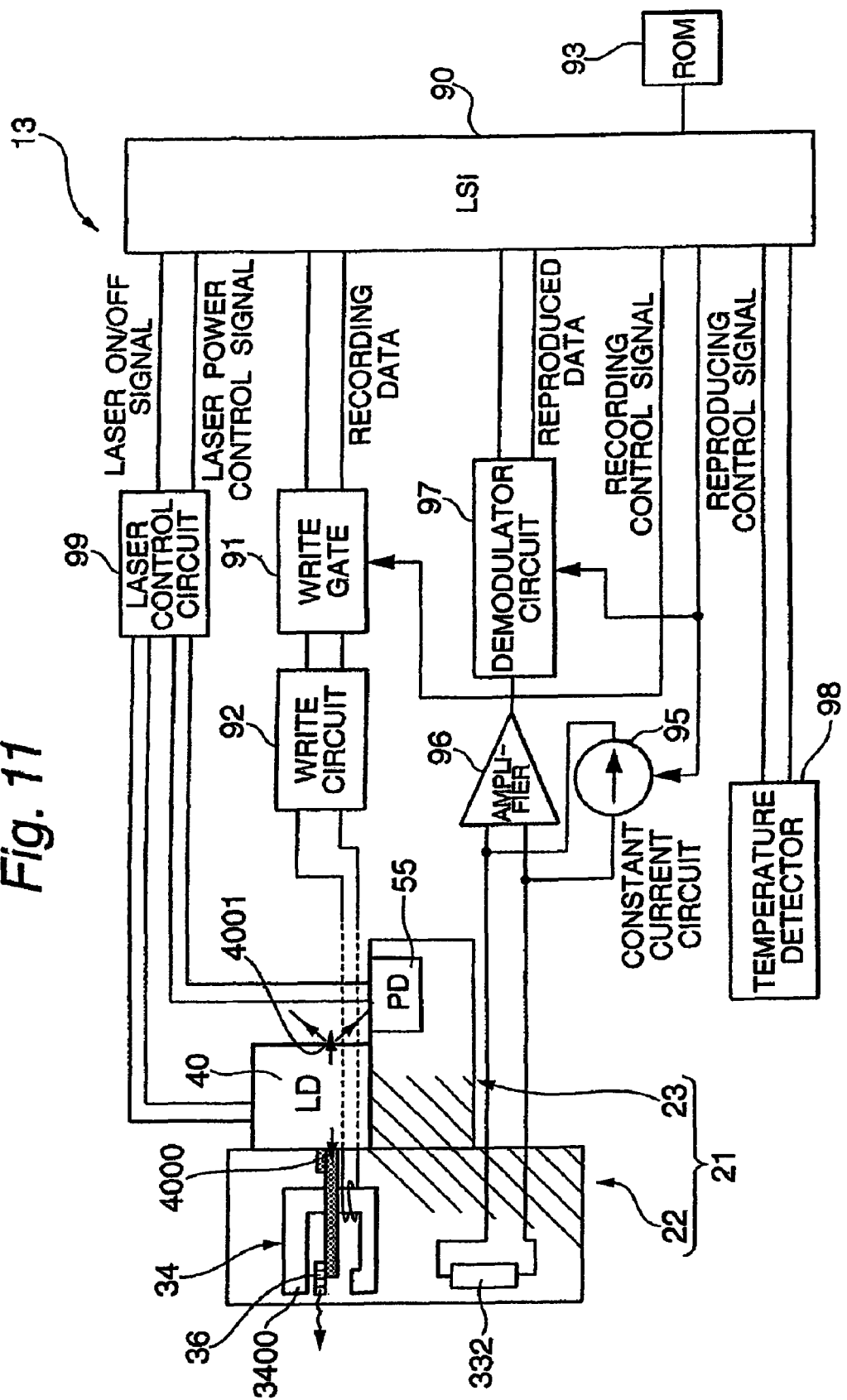
FIG. 11 shows a block diagram illustrating the circuit structure of the recording/reproducing and light-emission control circuit of the magnetic disk apparatus shown in FIG. 6.

FIG. 11 shows a block diagram illustrating the circuit structure of the recording/reproducing and light-emission control circuit 13 of the magnetic disk apparatus shown in FIG. 6.

According to FIG. 11, reference numeral 90 indicates a control LSI, 91 indicates a write gate for receiving recording data from the control LSI 90, 92 indicates a write circuit, 93 indicates a ROM that stores a control table or the like for controlling the value of operating current supplied to the laser diode 40, 95 indicates a constant current circuit for supplying sense current to the MR element 33, 96 indicates an amplifier for amplifying the output voltage from the MR element 33, 97 indicates a demodulator circuit for outputting reproduced data to the control LSI 90, 98 indicates a temperature detector, and 99 indicates a control circuit for controlling the laser diode 40, respectively.

The recording data outputted from the control LSI 90 is supplied to the write gate 91. The write gate 91 supplies recording data to the write circuit 92 only when a recording control signal outputted from the control LSI 90 instructs a write operation. The write circuit 92 applies write current according to this recording data to the write coil layer 343, and then a write operation is performed onto the magnetic disk 10 with write field generated from the main magnetic pole 3400. Further, a constant current flows from the constant current circuit 95 into the MR multilayer 332 only when the reproducing control signal outputted from the control LSI 90 instructs a read operation. The signal reproduced by the MR element 33 is amplified by the amplifier 96, demodulated by the demodulator circuit 97, and then, the obtained reproduced data is outputted to the control LSI 90.

A laser control circuit 99 receives a laser ON/OFF signal and a laser power control signal that are outputted from the control LSI 90. When the laser ON/OFF signal indicates an ON operation, an operating current greater than or equal to an oscillation threshold is applied to a laser diode 40. This causes the laser diode 40 to emit light and the emitted laser light propagates through a spot-size converter 43 and a waveguide 35 to become coupled to a surface-plasmon generator 36 in a surface plasmon mode. As a result, NF-light is emitted from the end of the surface-plasmon generator 36, and is applied to the magnetic recording layer of the magnetic disk 10 to heat the magnetic recording layer.

The operating current is controlled to a value that causes the laser diode 40 to emit laser light with an intensity specified by the laser power control signal. Specifically, a photodiode section 55 measures and monitors the output from the rear light-emission center 4001 of the laser diode 40 and sends a monitoring output (measured value) to the laser control circuit 99. The laser control circuit 99 uses the measured value to make feedback adjustment for controlling the operating current applied to the laser diode 40 to cause the laser diode 40 to emit laser light with the intensity specified by the laser power control signal from the light-emission center 4000.

For the feedback adjustment, preferably the relationship between the intensity of laser light emitted from the light-emission center 4000 of the laser diode 40 and the monitoring output from the photodiode section 55 which receives laser light emitted from the rear light-emission center 4001 is determined in advance. In the laser diode 40 of edge-emitting type, the ratio of the light output intensity from the rear light-emission center 4001 and the light output intensity from the light-emission center 4000 is set to be in the range, for example, from 2% to 25% depending on the design of the diode structure. Therefore, the relation between the light output intensity from the light-emission center 4000 and the monitoring output from the photodiode section 55 can be obtained by clarifying the relation between the light output intensity from the rear light-emission center 4001 and the monitoring output from the photodiode section 55.

The control LSI 90 generates the laser ON/OFF signal according to the timing of recording/reproducing operations, and determines the value of the laser power control signal by referring the value of temperature in the magnetic recording layer of the magnetic disk or the like, which is measured by the temperature detector 98, based on the control table in the ROM 93. Here, the control table may include data about the relationship between the operating current value and the mount of temperature increase due to thermal-assist operation in the magnetic recording layer, and data about the temperature dependence of the anisotropic magnetic field (coercive force) of the magnetic recording layer, as well as data about the temperature dependences of the oscillation threshold value and the characteristics of light output power vs. operating current. Thus, by providing the system of the laser ON/OFF signal and the laser power control signal independently from the recording/reproducing control signal system, it becomes possible to realize not only a current supply to the laser diode 40 linked simply with the recording operation but also more diversified current supply modes.

Obviously, the circuit structure of the recording/reproducing and light-emission control circuit 13 is not limited to the structure shown in FIG. 9. It is also possible to specify write and read operations by using signals other than the recording control signal and reproducing control signal.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A head gimbal assembly comprising: a thermally-assisted magnetic recording head formed by joining a light source unit and a slider, the light source unit comprising a light source and a photodetector that monitors light output from the light source, and the slider comprising a magnetic head element; and a suspension supporting the head, the suspension comprising:
 a base;
 a first wiring member for the light source and the photodetector, provided on a side of one surface of the base; and
 a second wiring member for the magnetic head element, provided on the side of the one surface of the base,
 the first wiring member and the second wiring member protruding from the base toward the thermally-assisted magnetic recording head.

2. The head gimbal assembly as claimed in claim 1, wherein a first insulating section, the first wiring member, a second insulating section, and the second wiring member are stacked on the one surface of the base in this order.

3. The head gimbal assembly as claimed in claim 2, wherein the suspension includes an opening or a hole; the thermally-assisted magnetic recording head is fixed onto the suspension in such a manner that the light source unit protrudes through the opening or hole to a side of the suspension opposite to a side on which the first and second wiring members are provided; the first wiring member, the second insulating section and the second wiring member protrude from the base toward the thermally-assisted magnetic recording head in the opening or hole; and at least the second insulating section and the second wiring member further protrude into an indentation provided in a portion of an overcoat layer provided in the slider, the portion being on a side opposite to an opposed-to-medium surface of the overcoat layer.

4. The head gimbal assembly as claimed in claim 3, wherein the first wiring member and the second wiring member are at a distance from each other without overlapping with each other when viewed from above the one surface of the base.

5. The head gimbal assembly as claimed in claim 3, wherein a grounded lead conductor for the light source and a grounded lead conductor for the photodetector are provided independently of each other.

6. The head gimbal assembly as claimed in claim 3, wherein the magnetic head element includes an electromagnetic transducer for writing data, and lead conductors of the first wiring member for the photodetector and lead conductors of the second wiring member for the electromagnetic transducer are provided at the greatest distance apart from each other among all the lead conductors.

7. The head gimbal assembly as claimed in claim 1, wherein the light source is an edge-emitting type laser diode, and a p-type electrode of the light source is bonded in a source-installation surface of a unit substrate of the light source unit.

8. The head gimbal assembly as claimed in claim 7, wherein a first electrode for the photodetector electrically connected to a p-type portion of the photodetector, a second electrode for the photodetector electrically connected to an n-type portion of the photodetector, and a first electrode for the light source electrically connected to a p-type electrode of the light source are provided in the source-installation surface of the light source unit; a second electrode for the light source is provided on an n-type electrode of the light source; and the first electrode for the photodetector, the second electrode for the photodetector, the first electrode for the light source, and the second electrode for the light source are electrically connected to the first wiring member.

9. The head gimbal assembly as claimed in claim 1, wherein the photodetector is formed inside the unit substrate of the light source unit, and a light-receiving portion of the photodetector is located on the source-installation surface side of the unit substrate, the light-receiving portion being configured to receive light emitted from a rear light-emission center positioned on a side opposite to a light-emission center of the light source, the light-emission center emitting light for thermal assist.

10. The head gimbal assembly as claimed in claim 9, wherein the photodetector is a semiconductor photodiode formed from a portion of the unit substrate.

11. A suspension used for a thermally-assisted magnetic recording head comprising a light source, a photodetector that monitors light output from the light source, and a magnetic head element, the suspension comprising:

a base;

a first wiring member for the light source and the photodetector, provided on a side of one surface of the base; and a second wiring member for the magnetic head element, provided on the side of the one surface of the base, the first wiring member and the second wiring member protruding from the base toward the thermally-assisted magnetic recording head to be fixed to the suspension.

12. A magnetic recording apparatus comprising at least one head gimbal assembly and at least one magnetic recording medium, the head gimbal assembly comprising: a thermally-assisted magnetic recording head formed by joining a light source unit and a slider, the light source unit comprising a light source and a photodetector that monitors light output from the light source, and the slider comprising a magnetic head element; and a suspension supporting the head, the suspension comprising: a base; a first wiring member for the light source and the photodetector, provided on a side of one surface of the base; and a second wiring member for the magnetic head element, provided on the side of the one surface of the base, the first wiring member and the second wiring member protruding from the base toward the thermally-assisted magnetic recording head, and the magnetic recording apparatus comprising a control circuit configured to control light-emission operations of the light source by using a monitor output from the photodetector, and to control write operations that the thermally-assisted magnetic recording head performs to the at least one magnetic recording medium.

\* \* \* \* \*